United States Patent
Rambo

(10) Patent No.: US 12,352,207 B1
(45) Date of Patent: Jul. 8, 2025

(54) AIRCRAFT GAS TURBINE ENGINE INCLUDING A STEAM SYSTEM

(71) Applicant: General Electric Company, Schenectady, NY (US)

(72) Inventor: Jeffrey D. Rambo, Mason, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/622,263

(22) Filed: Mar. 29, 2024

(51) Int. Cl.
| | | |
|---|---|---|
| *F02C 6/18* | (2006.01) | |
| *F01K 23/10* | (2006.01) | |
| *F02C 3/30* | (2006.01) | |
| *F02C 6/20* | (2006.01) | |

(52) U.S. Cl.
CPC .......... *F02C 6/18* (2013.01); *F02C 3/30* (2013.01); *F01K 23/10* (2013.01); *F02C 6/20* (2013.01)

(58) Field of Classification Search
CPC ...... F02C 6/18; F02C 6/20; F02C 3/30; F01K 23/10; F01K 23/101
See application file for complete search history.

(56) References Cited

U.S. PATENT DOCUMENTS

| | | |
|---|---|---|
| 1,048,046 A | 12/1912 | Currey |
| 5,896,740 A | 4/1999 | Shouman |
| 6,018,942 A | 2/2000 | Liebig |
| 6,405,520 B1 | 6/2002 | Thiel et al. |
| 7,032,373 B2 | 4/2006 | Franke et al. |
| 7,954,458 B2 | 6/2011 | Bozzuto et al. |
| 8,091,361 B1 | 1/2012 | Lang |
| 8,281,565 B2 | 10/2012 | Gulen |
| 9,046,037 B2 | 6/2015 | Broesamle et al. |

(Continued)

FOREIGN PATENT DOCUMENTS

| | | |
|---|---|---|
| FR | 3127269 A1 | 3/2023 |
| FR | 3130896 A1 | 6/2023 |
| FR | 3130897 A1 | 6/2023 |

(Continued)

OTHER PUBLICATIONS

Bjorn Fehrm, Leeham News and Analysis, "MTU gets support from Pratt & Whitney to develop the WET engine," published Nov. 29, 2022, available at https://leehamnews.com/2022/11/29/mtu-gets-support-from-pratt-whitney-to-develop-the-wet-engine/, as viewed on Jun. 30, 2023.

(Continued)

*Primary Examiner* — William H Rodriguez
(74) *Attorney, Agent, or Firm* — Venable LLP; David D. Leege; Michele V. Frank

(57) ABSTRACT

A turbine engine for an aircraft including a combustor, a turbine, and a steam system. The combustor generates combustion gases. The turbine receives the combustion gases and is drivingly coupled to a shaft. The steam system includes a boiler, a superheater, and a steam turbine. The boiler receives water and is fluidly connected to the combustor to receive a first portion of the combustion gases from the combustor and to boil the water to generate steam. The superheater is located downstream of the combustor to receive a second portion of the combustion gases from the combustor and to heat the steam. The steam turbine is fluidly coupled to the superheater to receive the steam from the superheater and to rotate the steam turbine. The steam turbine is drivingly coupled to the shaft.

20 Claims, 9 Drawing Sheets

(56) References Cited

U.S. PATENT DOCUMENTS

| | | | |
|---|---|---|---|
| 9,341,113 B2 | 5/2016 | John et al. | |
| 11,603,798 B1 | 3/2023 | Terwilliger et al. | |
| 11,976,580 B2* | 5/2024 | Klingels | F01K 21/005 |
| 11,988,137 B1* | 5/2024 | Snyder | F01K 23/10 |
| 2021/0207500 A1* | 7/2021 | Klingels | F02C 3/305 |
| 2022/0136414 A1 | 5/2022 | Velloso Mohedano | |
| 2023/0132248 A1 | 4/2023 | Macdonald et al. | |
| 2023/0150678 A1* | 5/2023 | Klingels | B64D 33/04 |
| | | | 244/55 |
| 2023/0374911 A1* | 11/2023 | Terwilliger | F02C 3/22 |
| 2024/0167427 A1* | 5/2024 | Terwilliger | F02C 7/143 |
| 2024/0254920 A1* | 8/2024 | Terwillger | F02C 7/16 |
| 2024/0271548 A1* | 8/2024 | Terwilliger | F01K 15/02 |
| 2024/0271549 A1* | 8/2024 | Terwilliger | F01K 23/10 |
| 2024/0271550 A1* | 8/2024 | Terwilliger | F01K 7/223 |

FOREIGN PATENT DOCUMENTS

| | | |
|---|---|---|
| FR | 3133367 A1 | 9/2023 |
| FR | 3133368 A1 | 9/2023 |

OTHER PUBLICATIONS

MTU Aero Engines, "Water-enhanced turbofan," available at https://www.mtu.de/technologies/clean-air-engine/water-enhanced-turbofan/, as viewed on Jun. 30, 2023.

Isabel Henrich, MTU Aero Engines, "A brief guide: How the WET concept works," published Jun. 2022, available at https://aeroreport.de/en/good-to-know/a-brief-guide-how-the-wet-concept-works, as viewed on Jun. 30, 2023.

Slides from Sustainable Water-Injecting Turbofan Comprising Hybrid-Electrics (SWITCH) Introduction at the 2023 NPSS Annual Consortium Meeting, Mar. 10, 2023.

* cited by examiner

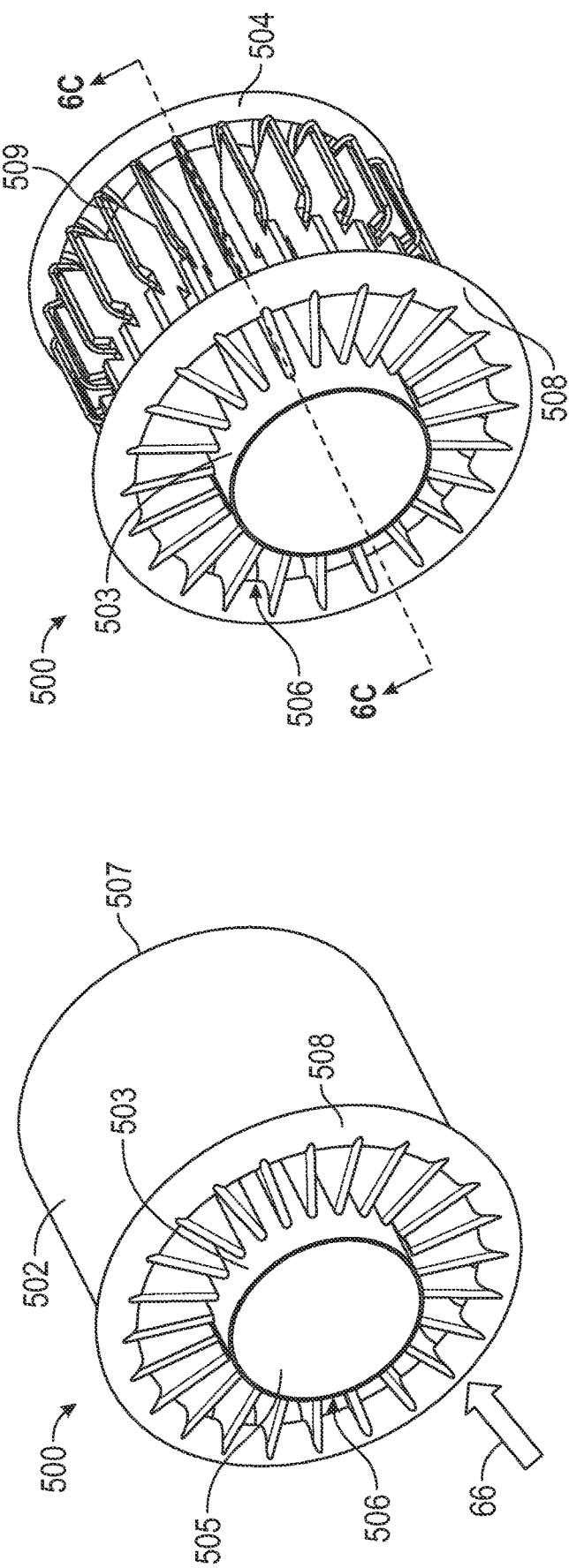
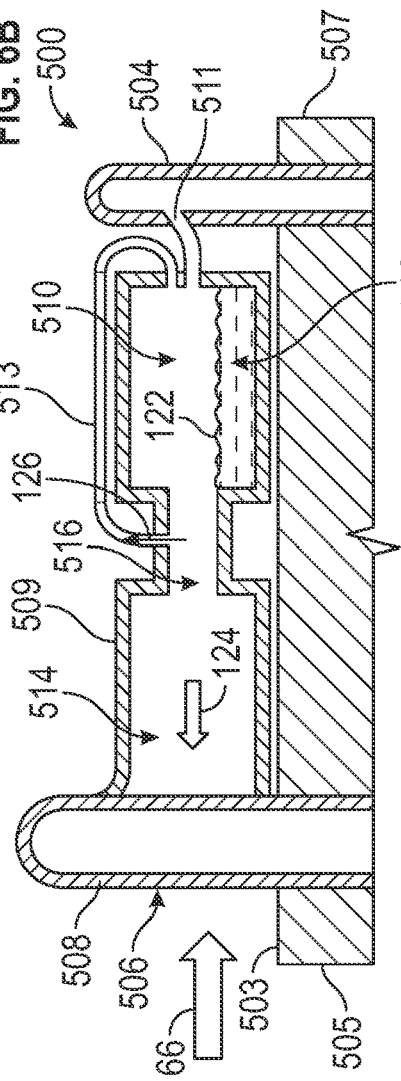
FIG. 6A
FIG. 6B
FIG. 6C

S700

- S702: Receiving combustion gases
- S704: Condensing feedwater from combustion gases to generate an exhaust-water mixture
- S706: Separate the feedwater from the exhaust-water mixture
- S708: Heat the feedwater
- S710: Provide a flow of the feedwater to a boiler

- S802: Measure temperature of steam
- S804: Compare temperature of steam to set point?
  - Higher → S806: Provide more feed water to the reservoir of the boiler
  - Lower → S808: Provide less feedwater to the reservoir of the boiler

FIG. 7C

AIRCRAFT GAS TURBINE ENGINE INCLUDING A STEAM SYSTEM

TECHNICAL FIELD

The present disclosure relates generally to turbine engines, particularly, turbine engines for aircraft.

BACKGROUND

Turbine engines used in aircraft generally include a fan and a core section arranged in flow communication with one another. A combustor is arranged in the core section to generate combustion gases for driving a turbine in the core section of the turbine engine.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

FIG. 6A is a forward schematic view of a boiler assembly, according to another embodiment.

FIG. 6B is a forward schematic view of the boiler assembly of FIG. 6A with an outer wall removed for clarity.

FIG. 6C is a partial schematic cross-sectional view of the boiler assembly taken along line 6C-6C in FIG. 6B.

FIGS. 7A to 7C are flow charts for methods of operating the turbine engine shown in FIG. 1, having one of the steam systems shown in FIGS. 2 to 4. FIG. 7A is a flow chart of a method of producing steam. FIG. 7B is a flow chart of a method of providing feedwater. FIG. 7C is a flow chart of a method for controlling the temperature of the steam produced using the method of FIG. 7A.

DETAILED DESCRIPTION

Figure 1:
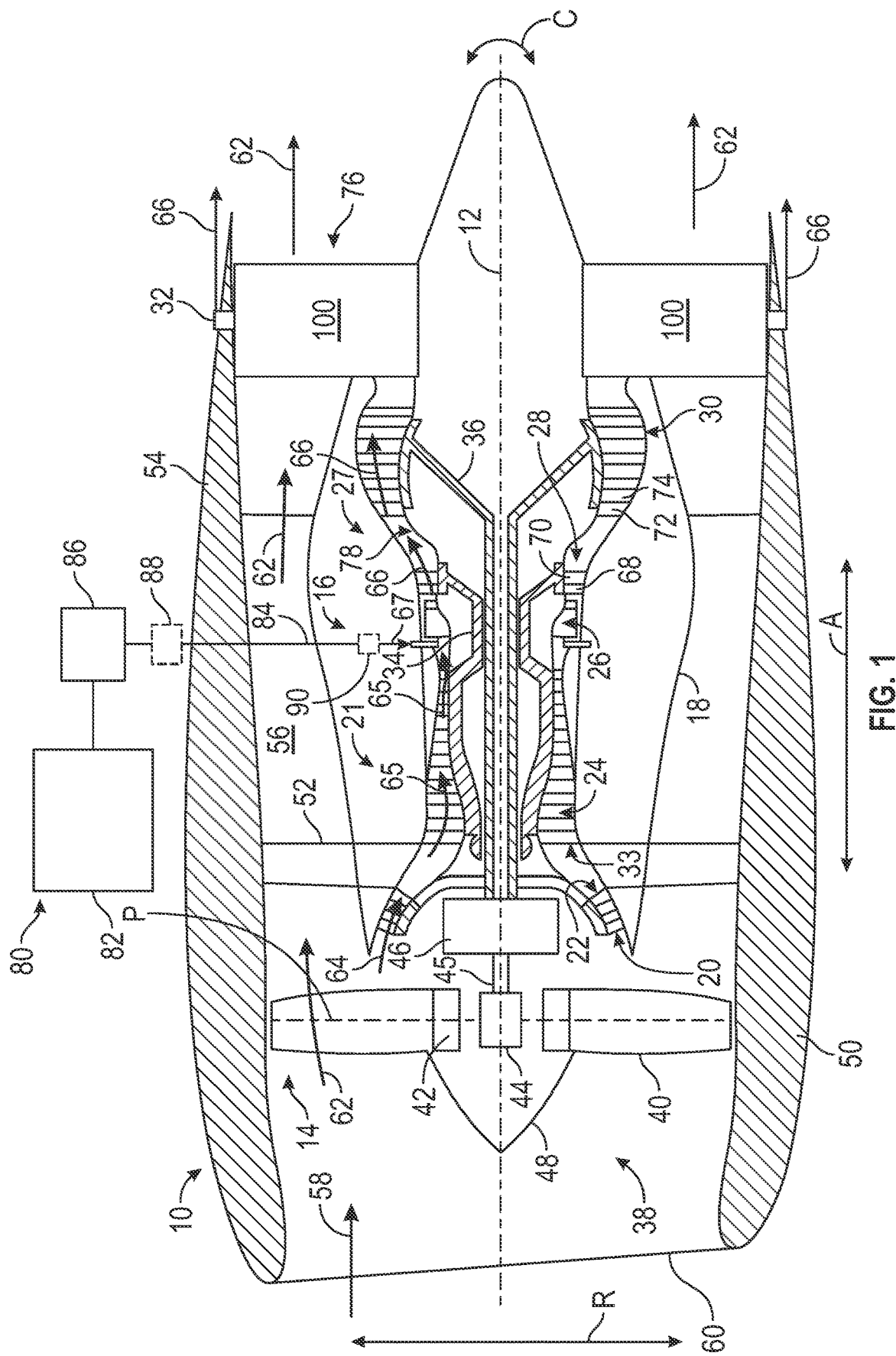
FIG. 1 is a schematic cross-sectional diagram of a turbine engine including a steam system, taken along a longitudinal centerline axis of the turbine engine, according to the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the present disclosure.

As used herein, the terms "first" and "second" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

References to "inner" and "outer" when discussed in the context of radial directions refer to positions relative to the longitudinal centerline of the component. In some embodiments, an "inner portion" refers to an inner half of the component, more specifically, to an inner third of the component, and even more specifically, to an inner quarter of the component. Likewise, an "outer portion" refers to an outer half of the component, more specifically, to an outer third of the component, and even more specifically, to an outer quarter of the component.

The singular forms "a," "an," and "the" include plural references unless the context clearly dictates otherwise.

Here and throughout the specification and claims, range limitations are combined and interchanged. Such ranges are identified and include all the sub-ranges contained therein unless context or language indicates otherwise. For example, all ranges disclosed herein are inclusive of the endpoints, and the endpoints are independently combinable with each other.

As noted above, a combustor is arranged in the core section to generate combustion gases for driving a turbine in the core section of the turbine engine. Not all of the energy and heat generated by the combustor is used to drive the turbine(s) of the turbine section. Instead, some of the waste heat is exhausted through a jet exhaust nozzle section in a conventional turbine engine. The turbine engine discussed herein includes a steam system that is used to recover some of the energy from the waste heat by generating steam and driving a steam turbine. Embodiments discussed herein may include a combined cycle aircraft engine with a Rankine bottoming cycle utilizing Brayton cycle exhaust energy as heat source. The Rankine bottoming cycle implements a reboiler configuration consisting of an evaporator upstream of a dryer/separator that returns saturated liquid to the evaporator and passes saturated vapor to a downstream superheater. The evaporator vessel also serves as a working fluid accumulator in the Rankine power cycle. Also, in the embodiments discussed herein, a portion of the combustion gases flows through an evaporator or a boiler to boil water to generate steam. Another portion of the combustion gases flows through another heat exchanger (i.e., a superheater) to further heat (i.e., superheat) the steam before the steam is directed through the steam turbine. After flowing through the steam turbine, the steam may be injected into the combustor.

Referring now to the drawings, FIG. 1 is a schematic cross-sectional diagram of a turbine engine 10 including a steam system 100, taken along a longitudinal centerline axis 12 (provided for reference) of the turbine engine 10, according to an embodiment of the present disclosure. As shown in FIG. 1, the turbine engine 10 has an axial direction A (extending parallel to the longitudinal centerline axis 12) and a radial direction R that is normal to the axial direction A. The circumferential direction C extends in a direction rotating about the longitudinal centerline axis 12. In general, the turbine engine 10 includes a fan section 14 and a turbo-engine 16 disposed downstream from the fan section 14.

The turbo-engine 16 includes a compressor section 21, a combustor 26, and a turbine section 27. The turbo-engine 16 depicted is substantially enclosed within an outer casing 18 that is substantially tubular and defines a core inlet 20. As depicted, the core inlet 20 is annular. As schematically shown in FIG. 1, the compressor section 21 includes a booster or a low-pressure compressor (LPC) 22 followed downstream by a high-pressure compressor (HPC) 24. The combustor 26 is downstream of the compressor section 21. The turbine section 27 is downstream of the combustor 26 and includes a high-pressure turbine (HPT) 28, followed downstream by a low-pressure turbine (LPT) 30. The turbo-engine 16 further includes one or more core exhaust nozzles 32 that are downstream of the turbine section 27, a high-pressure (HP) shaft 34 or a spool, and a low-pressure (LP) shaft 36. The HP shaft 34 drivingly connects the HPT 28 to the HPC 24. The HPT 28 and the HPC 24 rotate in unison through the HP shaft 34. The LP shaft 36 drivingly connects the LPT 30 to the LPC 22. The LPT 30 and the LPC 22 rotate in unison through the LP shaft 36. The compressor section 21, the combustor 26, the turbine section 27, and the one or more core exhaust nozzles 32 together define a core air flow path 33.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. In the case of a variable pitch fan, the plurality of fan blades 40 are rotatable relative to the disk 42 about a pitch axis P by virtue of the fan blades 40 being operatively coupled to an actuator 44 configured to collectively vary the pitch of the fan blades 40 in unison. The fan blades 40, the disk 42, and the actuator 44 are together rotatable about the longitudinal centerline axis 12 via a fan shaft 45 that is powered by the LP shaft 36 across a power gearbox, also referred to as a gearbox assembly 46. In this way, the fan 38 is drivingly coupled to, and powered by, the turbo-engine 16, and the turbine engine 10 is an indirect drive engine. The gearbox assembly 46 is shown schematically in FIG. 1. The gearbox assembly 46 is a reduction gearbox assembly for adjusting the rotational speed of the fan shaft 45 and, thus, the fan 38 relative to the LP shaft 36 when power is transferred from the LP shaft 36 to the fan shaft 45.

Referring still to the exemplary embodiment of FIG. 1, the disk 42 is covered by a rotatable fan hub 48 aerodynamically contoured to promote an airflow through the plurality of fan blades 40. In addition, the fan section 14 includes an annular fan casing or a nacelle 50 that circumferentially surrounds the fan 38 and/or at least a portion of the turbo-engine 16. The nacelle 50 is supported relative to the turbo-engine 16 by a plurality of circumferentially spaced outlet guide vanes 52. Moreover, a downstream section 54 of the nacelle 50 extends over an outer portion of the turbo-engine 16 and, with the outer casing 18, defines a bypass airflow passage 56 therebetween. The one or more core exhaust nozzles 32 may extend through the nacelle 50 and be formed therein. In this embodiment, the one or more core exhaust nozzles 32 include one or more discrete nozzles that are spaced circumferentially about the nacelle 50. Other arrangements of the core exhaust nozzles 32 may be used including, for example, a single core exhaust nozzle that is annular, or partially annular, about the nacelle 50.

During operation of the turbine engine 10, a volume of air 58 enters the turbine engine 10 through an inlet 60 of the nacelle 50 and/or the fan section 14. As the volume of air 58 passes across the fan blades 40, a first portion of air (bypass air 62) is routed into the bypass airflow passage 56, and a second portion of air (core air 64) is routed into the upstream section of the core air flow path 33 through the annular core inlet 20. The ratio between the first portion of air (bypass air 62) and the second portion of air (core air 64) is known as a bypass ratio. The pressure of the core air 64 is then increased by the LPC 22 compressing the core air 64 to generate compressed air 65, and the compressed air 65 is routed through the HPC 24 and further compressed before being directed into the combustor 26, where the compressed air 65 is mixed with fuel 67 and burned to generate combustion gases 66 (combustion products). One or more stages may be used in each of the LPC 22 and the HPC 24, with each subsequent stage further compressing the compressed air 65.

The combustion gases 66 are routed into the HPT 28 and expanded through the HPT 28 where a portion of thermal energy and/or kinetic energy from the combustion gases 66 is extracted via one or more stages of HPT stator vanes 68 and a plurality of HPT rotor blades 70 that are coupled to the HP shaft 34. This causes the HP shaft 34 to rotate, which supports operation of the HPC 24 (self-sustaining cycle). In this way, the combustion gases 66 do work on the HPT 28. The combustion gases 66 are then routed into the LPT 30 and expanded through the LPT 30. Here, a second portion of thermal energy and/or the kinetic energy is extracted from the combustion gases 66 via one or more stages of LPT stator vanes 72 and a plurality of LPT rotor blades 74 that are coupled to the LP shaft 36. This causes the LP shaft 36 to rotate, thereby supporting operation of the LPC 22 (self-sustaining cycle) and rotation of the fan 38 via the gearbox assembly 46. In this way, the combustion gases 66 do work on the LPT 30.

The combustion gases 66 are subsequently routed through the one or more core exhaust nozzles 32 of the turbo-engine 16 to provide propulsive thrust. Simultaneously with the flow of the core air 64 through the core air flow path 33, the bypass air 62 is routed through the bypass airflow passage 56 before being exhausted from a fan bypass nozzle 76 of the turbine engine 10, also providing propulsive thrust. The combustor 26, the HPT 28, the LPT 30, and the one or more core exhaust nozzles 32 at least partially define a hot gas path 78 for routing the combustion gases 66 through the turbo-engine 16.

As noted above, the compressed air 65 (i.e., the core air 64) is mixed with the fuel 67 in the combustor 26 to generate a fuel and air mixture, and combusted, generating combustion gases 66 (i.e., combustion products). The fuel 67 can include any type of fuel used for turbine engines, such as, for example, sustainable aviation fuels (SAF) including biofuels, JetA, or other hydrocarbon fuels. The fuel 67 also may be a hydrogen-based fuel (H₂), and, while hydrogen-based fuel may include blends with hydrocarbon fuels, the fuel 67 used herein is unblended, for example, and referred to herein as hydrogen fuel. In some embodiments, the hydrogen fuel may be substantially pure hydrogen molecules (i.e., diatomic hydrogen). The fuel 67 may also be a cryogenic fuel. For example, when the hydrogen fuel is used, the hydrogen fuel may be stored in a liquid phase at cryogenic temperatures.

The turbine engine 10 includes a fuel system 80 for providing the fuel 67 to the combustor 26. The fuel system 80 includes a fuel tank 82 for storing the fuel 67 therein, and a fuel delivery assembly 84. The fuel tank 82 can be located on an aircraft (not shown) to which the turbine engine 10 is attached. While a single fuel tank 82 is shown in FIG. 1, the fuel system 80 can include any number of fuel tanks 82, as desired. The fuel delivery assembly 84 delivers the fuel 67 from the fuel tank 82 to the combustor 26. The fuel delivery assembly 84 includes one or more lines, conduits, pipes, tubes, etc., configured to carry the fuel 67 from the fuel tank 82 to the combustor 26. The fuel delivery assembly 84 also includes a pump 86 to induce the flow of the fuel 67 through the fuel delivery assembly 84 to the combustor 26. In this way, the pump 86 pumps the fuel 67 from the fuel tank 82, through the fuel delivery assembly 84, and into the combustor 26. The fuel system 80 and, more specifically, the fuel tank 82 and the fuel delivery assembly 84, either collectively or individually, may be a fuel source for the combustor 26.

In some embodiments, for example, when the fuel 67 is a hydrogen fuel, the fuel system 80 includes one or more vaporizers 88 (illustrated by dashed lines) and a metering valve 90 (illustrated by dashed lines) in fluid communication with the fuel delivery assembly 84. In this example, the hydrogen fuel is stored in the fuel tank 82 as liquid hydrogen fuel. The one or more vaporizers 88 heat the liquid hydrogen fuel flowing through the fuel delivery assembly 84. The one or more vaporizers 88 are positioned in the flow path of the fuel 67 between the fuel tank 82 and the combustor 26, and are located downstream of the pump 86. The one or more vaporizers 88 are in thermal communication with at least one heat source, such as, for example, waste heat from the turbine engine 10 and/or from one or more systems of the aircraft (not shown). The one or more vaporizers 88 heat the liquid hydrogen fuel and the liquid hydrogen fuel is converted into a gaseous hydrogen fuel within the one or more vaporizers 88. The fuel delivery assembly 84 directs the gaseous hydrogen fuel into the combustor 26.

The metering valve 90 is positioned downstream of the one or move vaporizers 88 and the pump 86. The metering valve 90 receives hydrogen fuel in a substantially completely gaseous phase, or in a substantially completely supercritical phase. The metering valve 90 provides the flow of fuel to the combustor 26 in a desired manner. More specifically, the metering valve 90 provides a desired volume of hydrogen fuel at, for example, a desired flow rate, to a fuel manifold that includes one or more fuel injectors that inject the hydrogen fuel into the combustor 26. The fuel system 80 can include any components for supplying the fuel 67 from the fuel tank 82 to the combustor 26, as desired.

The turbine engine 10 includes the steam system 100 in fluid communication with the one or more core exhaust nozzles 32 and the fan bypass nozzle 76. The steam system 100 extracts steam from the combustion gases 66 as the combustion gases 66 flow through the steam system 100, as detailed further below.

The turbine engine 10 may be viewed with respect to a "clock" orientation having a twelve o'clock position, a three o'clock position, a six o'clock position, a nine o'clock position, and all clock positions therebetween. Such positions are circumferential positions of the turbine engine 10 taken about the longitudinal centerline axis 12, and relative to the view shown in FIG. 1, the three o'clock position and the nine o'clock position are located at the longitudinal centerline axis 12.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, and/or turboprop engines.

Figure 2:
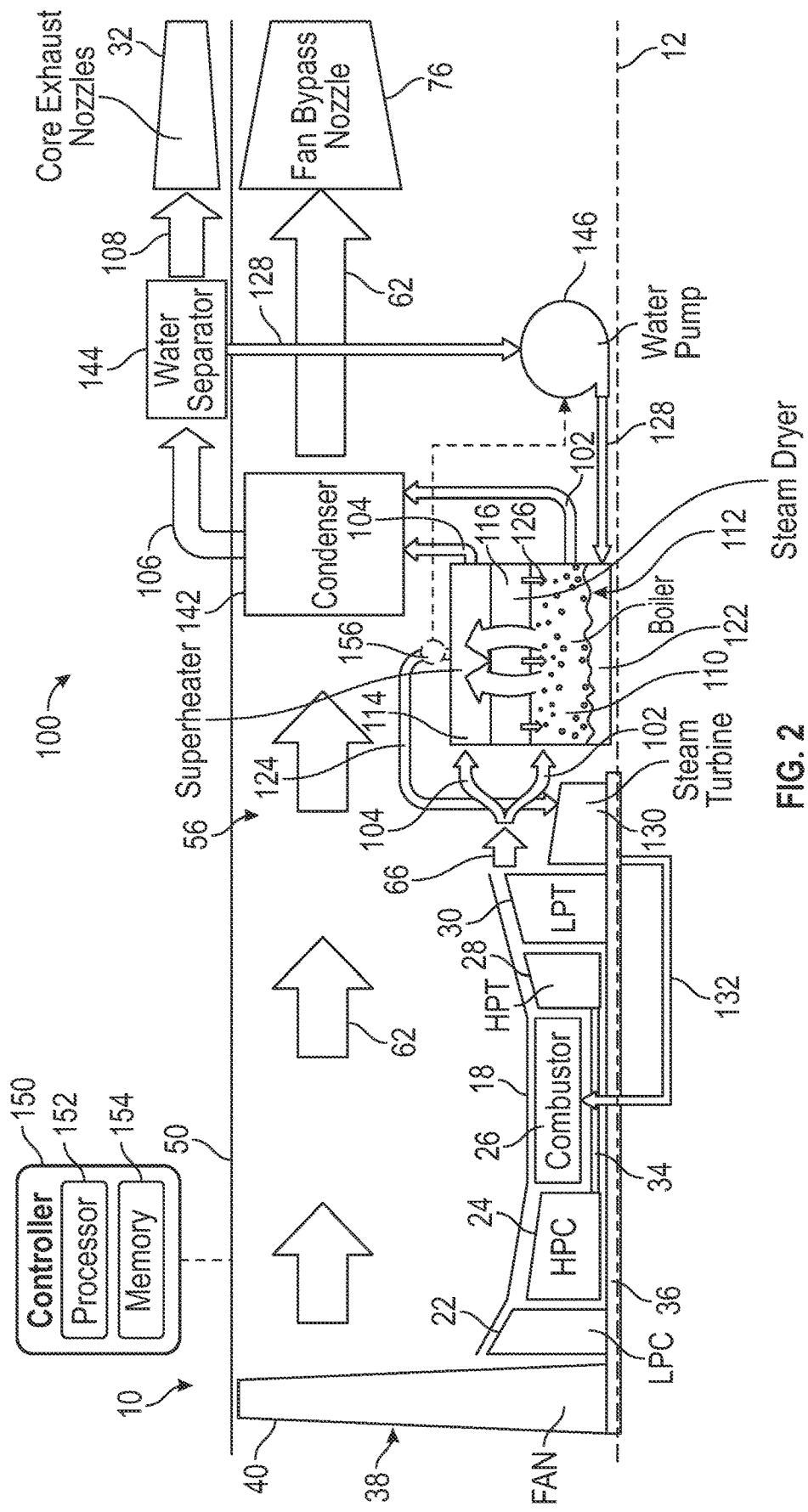
FIG. 2 is a schematic diagram of the turbine engine and a steam system according to an embodiment of the present disclosure.

FIG. 2 is a schematic diagram of the turbine engine 10 having a steam system 100, according to an embodiment of the present disclosure. The steam system 100 may be used as the steam system 100 in the turbine engine 10 shown in FIG. 1. For clarity, various features of the turbine engine 10 described and shown above are shown schematically in FIG. 2 and some components are not shown in FIG. 2, but the description of such components also applies here.

The steam system 100 includes a boiler 110. The boiler 110 is a heat exchanger that vaporizes liquid water from a water source to generate steam 124, as detailed further below, and may also be referred to as a reboiler. The boiler 110 is thus a steam source. The water, whether in liquid form or in vapor (steam), is a working fluid. In particular, the boiler 110 is an exhaust gas-water heat exchanger. The boiler 110 includes a reservoir 112 containing a volume of water 122. The boiler 110 and, more specifically, the reservoir 112, is sized to contain from twenty percent (20%) to eighty percent (80%) of the liquid water, by volume, in the steam system 100, and, more specifically, from fifty percent (50%) to seventy percent (70%) of the liquid water, by volume, in the steam system 100. In this way, the boiler 110 and, more specifically, the reservoir 112 can be an accumulator for the steam system 100. The boiler 110 is in fluid communication with the hot gas path 78 (FIG. 1) and is positioned downstream of the LPT 30. In the depicted embodiment, the combustion gases 66 are split downstream of the LPT 30 into a first portion of the combustion gases 66 (referred to herein as a first combustion gas portion 102) and a second portion of the combustion gases 66 (referred to herein as a second combustion gas portion 104).

The boiler 110 receives the first combustion gas portion 102, and the first combustion gas portion 102 flows through a fluid passage of the boiler 110 and is in thermal contact with the water 122 in the reservoir 112. The first combustion gas portion 102 transfers heat from the first combustion gas portion 102 to the water 122 in the reservoir 112 to heat and to boil the water 122, generating steam 124. The boiler 110 can include any type of boiler or heat exchanger for extracting heat from the first combustion gas portion 102 and vaporizing the liquid water 122 into steam 124 as the first combustion gas portion 102 flows through the boiler 110. In the embodiments discussed herein, the first combustion gas portion 102 flows through the boiler 110 to transfer heat from the first combustion gas portion 102 to the water 122 and to generate the steam 124 by subcooled, nucleate boiling (also referred to as precritical boiling). In some embodiments, the fluid passage of the boiler 110 through which the first combustion gas portion 102 flows, may be submerged in the water 122 to facilitate precritical boiling.

As will be discussed further below, the steam 124 flows through a steam turbine 130 generating additional work for the turbine engine 10 (e.g., work in addition to the work done in the HPT 28 and the LPT 30). By increasing the temperature and/or the pressure of the steam 124 before the steam 124 flows into the steam turbine 130, more work can be extracted from the steam 124. In this embodiment, the steam system 100 also includes a superheater 114 positioned downstream of the boiler 110 relative to the flow of the steam 124. The superheater 114 is a steam-exhaust gas heat exchanger used to further heat (i.e., superheat) the steam 124 before the steam flows into the boiler 110. The superheater 114 is in fluid communication with the hot gas path 78 to receive the combustion gases 66 and, more specifically, the second combustion gas portion 104. The superheater 114 is thus located in parallel with the boiler 110 relative to the flow of the combustion gases 66 through the steam system 100. The superheater 114 is also in fluid communication with the boiler 110. The second combustion gas portion 104 flows through one fluid passage of the superheater 114, and the steam 124 flows through another fluid passage of the superheater 114. The second combustion gas portion 104 is thus in thermal contact with the steam 124, and heat from the second combustion gas portion 104 flows into the steam 124 adding heat to the steam 124 to superheat the steam 124. The superheater 114 may be any suitable heat exchanger for transferring heat between two gases.

Initially, the steam 124 generated in the boiler 110 may be relatively wet, including entrained liquid water. If this wet steam 124 is passed into the superheater 114, some of the heat from the second combustion gas portion 104 would need to be used to vaporize the entrained liquid water. Thus, in this embodiment, the steam system 100 also includes a steam dryer 116. The steam dryer 116 is positioned upstream of the boiler 110 and downstream of the superheater 114 relative to the flow of the steam 124. The steam dryer 116 is a water separator that separates the entrained liquid water from the steam 124. Various suitable water separators may be used, but, in the turbine engine 10, which may have an annular construction, the steam dryer 116 may be an inertial separator (i.e., an inertial water separator), as opposed to a gravity separator (i.e., a gravity water separator). Suitable inertial water separators include, for example, cyclonic separators. The steam dryer 116 may be fluidly connected to the boiler 110 and, more specifically, the reservoir 112 for the water separated from the steam 124 by the steam dryer 116 (i.e., separated water 126) to flow back into the reservoir 112 of the boiler 110.

The now dry and superheated steam 124 is directed into a steam turbine 130. The steam turbine 130 includes one or more stages of steam turbine blades (not shown) and steam turbine stators (not shown). The steam 124 flows from the boiler 110, via the steam dryer 116 and the superheater 114, into the steam turbine 130, through one or more steam lines (as indicated by the arrow for the steam 124 in FIG. 2), causing the steam turbine blades of the steam turbine 130 to rotate, which generates additional work in an output shaft connected to the turbine blades of the steam turbine 130. As noted above, the turbo-engine 16 includes one or more shafts, also referred to as engine shafts, coupling various rotating components of the turbo-engine 16 and other thrust producing components such as the fan 38. In the turbo-engine 16 shown in FIG. 1, these engine shafts include the HP shaft 34 and the LP shaft 36. The steam turbine 130 is coupled to one of the engine shafts of the turbo-engine 16, such as the HP shaft 34 or the LP shaft 36. In the illustrated embodiment, the steam turbine 130 is coupled to the LP shaft 36. As the steam 124 flows from the boiler 110 through the steam turbine 130, the kinetic energy of this gas is converted by the steam turbine 130 into mechanical work in the LP shaft 36. The reduced temperature steam (as steam 132) exiting the steam turbine 130 is then injected into the core air flow path 33, such as into the combustor 26, upstream of the combustor 26, or downstream of the combustor 26. The steam 132 flows through one or more steam lines from the steam turbine 130 to the core air flow path 33. The steam 132 injected into the core air flow path 33 adds mass flow to the core air 64 such that less core air 64 is needed to produce the same amount of work through the turbine section 27. In this way, the steam system 100 extracts additional work from the heat in exhaust gas that would otherwise be wasted. The steam 132 injected into the core air flow path 33 is in a range of 20% to 50% of the mass flow through the core air flow path 33.

In this embodiment, water is condensed from the combustion gases 66. This water is referred to herein as feedwater 128, as this water will be supplied to the reservoir 112 to control the volume of the water 122 within the boiler 110. Each of the first combustion gas portion 102 and the second combustion gas portion 104, after flowing through the boiler 110 and the superheater 114, respectively, flows into a condenser 142. The combustion gases 66 and, more specifically, the first combustion gas portion 102 and the second combustion gas portion 104 are cooled by transferring heat to boil the water 122 within the reservoir 112 and to heat the steam 124, and, in the condenser 142, the combustion gases 66 are further cooled. The condenser 142 is a heat exchanger that further cools the combustion gases 66 as the combustion gases 66 flow through the condenser 142. In particular, the condenser 142 is an air-exhaust gas heat exchanger. The condenser 142 is in fluid communication with the boiler 110 and the superheater 114. In this embodiment, the condenser 142 is positioned within the bypass airflow passage 56. The condenser 142, however, may be positioned elsewhere and thermally connected to other cooling sources, such as being thermally connected to the fuel 67 to transfer heat to the fuel 67, particularly, when the fuel 67 is a cryogenic fuel such as hydrogen fuel. The condenser 142 can include any type of condenser for condensing water from the exhaust (e.g., the combustion gases 66).

The steam system 100 also includes a water separator 144. The water separator 144 is in fluid communication with the condenser 142 for receiving cooled exhaust (i.e., combustion gases 66) having condensed water entrained therein. The water separator 144 is also in fluid communication with the one or more core exhaust nozzles 32 and with a water pump 146. The water separator 144 includes any type of water separator for separating water from the exhaust. For example, the water separator 144 can include a cyclonic separator that uses vortex separation to separate the water from the air. In such embodiments, the water separator 144 generates a cyclonic flow within the water separator 144 to separate the water from the cooled exhaust. In FIG. 2, the water separator 144 is schematically depicted as being in the nacelle 50, but the water separator 144 could be located at other locations within the turbine engine 10, such as, for example, radially inward of the nacelle 50, closer to the turbo-engine 16. The water separator 144 may be driven to rotate by one of the engine shafts, such as the HP shaft 34 or the LP shaft 36.

The boiler 110 receives liquid water (e.g., the feedwater 128 in this embodiment) from a water source to generate the steam 124. In the embodiment depicted in FIG. 2, the condenser 142 and the water separator 144, individually or collectively, are the water source for the boiler 110 and, more specifically, the reservoir 112. In operation, the combustion gases 66, also referred to as exhaust, flow from the LPT 30 into the boiler 110 or the superheater 114. The combustion gases 66 (more specifically, the first combustion gas portion 102) transfer heat into the water 122 within the boiler 110 and the combustion gases 66 (more specifically, the second combustion gas portion 104) transfer heat into the steam 124 within the superheater 114, as discussed above. The combustion gases 66 (i.e., the first combustion gas portion 102 and the second combustion gas portion 104) then flow into the condenser 142. The condenser 142 condenses the feedwater 128 from the combustion gases 66. For example, the bypass air 62 flows through the bypass airflow passage 56 and over or through the condenser 142, and extracts heat from the combustion gases 66, cooling the combustion gases 66 and condensing the feedwater 128 from the combustion gases 66, to generate an exhaust-water mixture 106. The bypass air 62 is then exhausted out of the turbine engine 10 through the fan bypass nozzle 76 to generate thrust, as detailed above. The condenser 142 thus may be positioned in bypass airflow passage 56.

The exhaust-water mixture 106 flows into the water separator 144. The water separator 144 separates the feedwater 128 from the exhaust of the exhaust-water mixture 106 to generate separate exhaust 108 and the feedwater 128. The exhaust 108 is exhausted out of the turbine engine 10 through the one or more core exhaust nozzles 32 to generate thrust, as detailed above. The boiler 110, the superheater 114, the condenser 142, and the water separator 144 thus also define a portion of the hot gas path 78 for routing the combustion gases 66, the exhaust-water mixture 106, and the exhaust 108 through the steam system 100 of the turbine engine 10.

The boiler 110 and, more specifically, the reservoir 112, is in fluid communication with the water separator 144 to receive the feedwater 128 from the water separator 144. The steam system 100 includes a water pump 146. The water pump 146 is in fluid communication with the water separator 144. The water pump 146 pumps the feedwater 128 through one or more water lines (as indicated by the arrow for the feedwater 128 in FIG. 2) to direct the feedwater 128 into the reservoir 112 of the boiler 110. The water pump 146 is thus in fluid communication with the boiler 110 and, more specifically the reservoir 112. The water pump 146 also is in fluid communication with the condenser 142 via the water separator 144. The water pump 146 may be any suitable pump, such as a centrifugal pump or a positive displacement pump.

The water pump 146 may be used to induce a flow of the feedwater 128 into the reservoir 112 and may also be used to control the temperature of the steam 124. A temperature sensor 156 may be positioned in the flow of the steam 124 (or steam 132) to detect the temperature of the steam 124. In this embodiment, the temperature sensor 156 is located downstream of the superheater 114 and upstream of the steam turbine 130 to detect and subsequently to control the temperature of the steam 124. More specifically, the temperature sensor 156 is directly or indirectly communicatively coupled to the water pump 146, and the water pump 146 may be controlled based on the temperature detected by the temperature sensor 156 or other output from the temperature sensor 156 indicative of the temperature of the steam 124.

The temperature sensor 156 may be communicatively coupled to a controller 150, and the controller 150 is communicatively and operatively coupled to the water pump 146. The controller 150 of this embodiment is an engine controller of the turbine engine 10, but other suitable controllers may be used including separate controllers for operating the water pump 146. The controller 150 is configured to operate various aspects of the turbine engine 10, including, in this embodiment, the water pump 146. The controller 150 may be a Full Authority Digital Engine Control (FADEC). In this embodiment, the controller 150 is a computing device having one or more processors 152 and one or more memories 154. The processor 152 can be any suitable processing device, including, but not limited to, a microprocessor, a microcontroller, an integrated circuit, a logic device, a programmable logic controller (PLC), an application-specific integrated circuit (ASIC), and/or a Field Programmable Gate Array (FPGA). The memory 154 can include one or more computer-readable media, including, but not limited to, non-transitory computer-readable media, a computer-readable non-volatile medium (e.g., a flash memory), a RAM, a ROM, hard drives, flash drives, and/or other memory devices.

The memory 154 can store information accessible by the processor 152, including computer-readable instructions that can be executed by the processor 152. The instructions can be any set of instructions or a sequence of instructions that, when executed by the processor 152, causes the processor 152 and the controller 150 to perform operations. In some embodiments, the instructions can be executed by the processor 152 to cause the processor 152 to complete any of the operations and functions for which the controller 150 is configured, as will be described further below. The instructions can be software written in any suitable programming language, or can be implemented in hardware. Additionally, and/or alternatively, the instructions can be executed in logically and/or virtually separate threads on the processor 152. The memory 154 can further store data that can be accessed by the processor 152.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between components and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

When the controller 150 receives an input from the temperature sensor 156, the controller 150 may use the input to determine how the temperature compares to a desired steam temperature (set point) for a particular operating condition of the turbine engine 10. When the temperature of the steam 124 is hotter than desired for a particular operational condition of the turbine engine 10, the speed of the water pump 146 is increased, providing more feedwater 128 and increasing the amount of water 122 within the reservoir 112 of the boiler 110. In this embodiment, the first combustion gas portion 102 provides a fixed amount of heat/energy to the boiler 110. With more water 122, there is more mass for the first combustion gas portion 102 to heat, resulting in a decrease or a reduction in the overall temperature of the steam 124. Conversely, if the temperature of the steam 124 is colder than desired for a particular operational condition of the turbine engine 10, the speed of the water pump 146 may be reduced providing less feedwater 128 to the reservoir 112 and reducing the total amount of water 122 within the reservoir 112. As a result, the temperature of the steam 124 can be increased.

In one embodiment, the boiler 110 section may be located in a lower portion of the turbine engine 10, such as extending clockwise between a two o'clock position and a ten o'clock position. The superheater 114 may be located in an upper portion of the engine such as extending clockwise between the ten o'clock position and the two o'clock position. In such a configuration, gravitational forces help retain the water 122 in the reservoir 112 with the steam 124 flowing to the superheater 114 in the upper portion of the turbine engine 10. Alternatively, the boiler 110 and superheater 114 may be configured with the boiler 110 in an inner annulus of the turbo-engine 16 and the superheater 114 positioned radially outward from the boiler 110. Additionally, or alternatively, the boiler 110 may be arranged in a serial flow arrangement with the superheater 114 with respect to the longitudinal centerline axis 12 of the turbine engine 10 or the flow path direction of the combustion gases 66.

Figure 3:
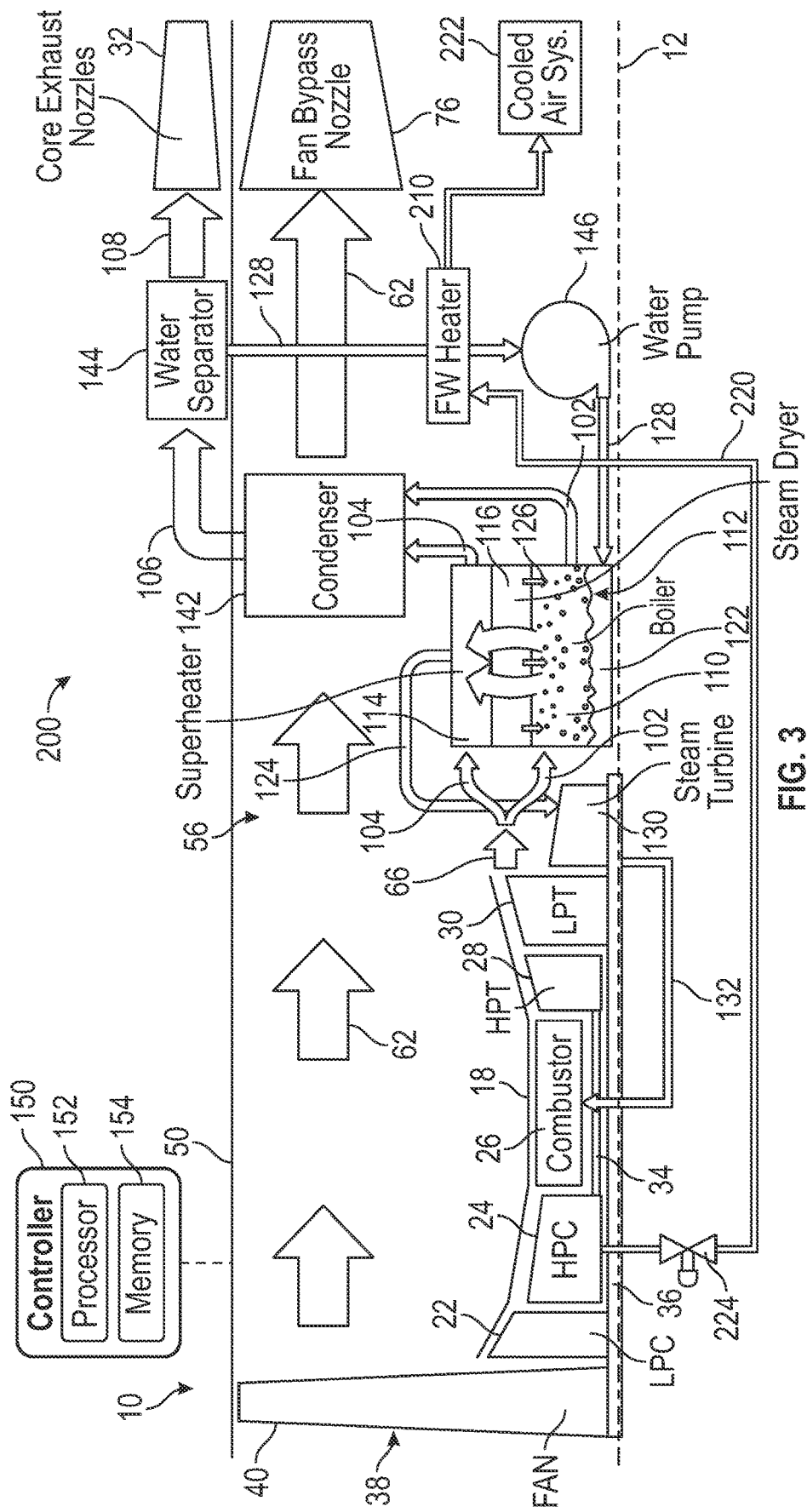
FIG. 3 is a schematic diagram of the turbine engine and a steam system according to an embodiment of the present disclosure.

FIG. 3 is a schematic diagram of the turbine engine 10 having a steam system 200 according to another embodiment of the present disclosure. The steam system 200 of this embodiment may be used as the steam system 100 in the turbine engine 10 shown in FIG. 1. This steam system 200 is similar to the steam system 100 discussed above with reference to FIG. 2. The same reference numerals will be used for components of the steam system 200 of this embodiment that are the same as or similar to the components of the steam system 100 discussed above. The description of these components above also applies to this embodiment, and a detailed description of these components is omitted here.

As noted above, the first combustion gas portion 102 is used to boil the water 122 and create the steam 124. When the feedwater 128 is added, the feedwater 128 may be heated before being supplied to the reservoir 112 so that more of the heat from the first combustion gas portion 102 may be used for generating the steam 124, instead of being used to heat the added water (feedwater 128). For example, the feedwater 128 may be above freezing, but less than one hundred fifty degrees Fahrenheit (150° F.) (sixty-six degrees Celsius (66° C.)), such as less than one hundred degrees Fahrenheit (100° F.) (thirty-eight degrees Celsius (38° C.)) or even fifty degrees Fahrenheit (50° F.) (ten degrees Celsius (10° C.)). To heat the feedwater 128, the steam system 200 includes a heat exchanger referred to herein as a feedwater heater 210 placed in the flow of the feedwater 128 upstream of the boiler 110. More specifically, in this embodiment, the feedwater heater 210 is located downstream of the water separator 144. The feedwater heater 210 may be located either upstream or downstream of the water pump 146 and in FIG. 3, the feedwater heater 210 is shown upstream of water pump 146.

The feedwater heater 210 includes a feedwater flow passage through which the feedwater 128 flows. A secondary fluid that is hotter than the feedwater 128 also flows through the feedwater heater 210 through a secondary flow passage of the feedwater heater 210. As the feedwater 128 flows through the feedwater heater 210, the feedwater 128 absorbs heat from the secondary fluid, heating the feedwater 128 and cooling the secondary fluid. Various suitable fluids may be used as the secondary fluid. In this embodiment, the secondary fluid is air that is cooled within the feedwater heater 210 and is used to cool various components of the turbine engine 10 and, more specifically, various components of the hot gas path 78 including, for example, the HPT 28 and the LPT 30. The air is core air 64 in this embodiment and, more specifically, can be a portion of the compressed air 65 flowing through the LPC 22 or HPC 24, which is referred to herein as compressor bleed air 220. In the embodiment shown in FIG. 2, the compressor bleed air 220 is drawn from the HPC 24 and flows through a flow path, such as a duct, indicated by the arrow 220. The compressor bleed air 220 is hot air and may be from three hundred degrees Fahrenheit (300° F.) (one hundred forty-nine degrees Celsius (149° C.)) to one thousand degrees Fahrenheit (1000° F.) (five hundred thirty-eight degrees Celsius (538° C.)) depending upon the stage after which the compressor bleed air 220 is drawn.

The feedwater heater 210 may be any type of heat exchanger for transferring heat from the secondary fluid to the feedwater 128. In the embodiments discussed herein, the feedwater heater 210 is a heat exchanger suitable for transferring heat from a gas, such as the compressor bleed air 220, to a liquid, such as the feedwater 128. After being cooled in the feedwater heater 210, the compressor bleed air 220 becomes cooling air and flows to one or more systems that use the compressor bleed air 220, which are referred to as cooled air system 222. The cooled air system 222 may be, as noted above, a cooling system for one or more components of the turbine engine 10, such as the HPT stator vanes 68, the HPT rotor blades 70, the LPT stator vanes 72, and the LPT rotor blades 74. The cooled air system 222 may also include one or more systems onboard the aircraft.

The steam system 200 of this embodiment also includes a compressor bleed air flow control valve 224. The compressor bleed air flow control valve 224 is located in the flow path (e.g., line) of the compressor bleed air 220 downstream of the HPC 24 and upstream of the feedwater heater 210 to control the flow (volume) of compressor bleed air 220 flowing from the HPC 24 and through the feedwater heater 210. Any suitable flow control valve may be used as the compressor bleed air flow control valve 224. The compressor bleed air flow control valve 224 may have a closed position and a plurality of open positions including a fully open position. The compressor bleed air flow control valve 224 may be an electrically operable valve, a hydraulically operable valve, or a pneumatically operable valve. When the compressor bleed air flow control valve 224 is hydraulically operable, the hydraulic fluid may be suitable fluids of the turbine engine 10 including, for example, the fuel 67, lubrication oil, and the like.

Figure 4:
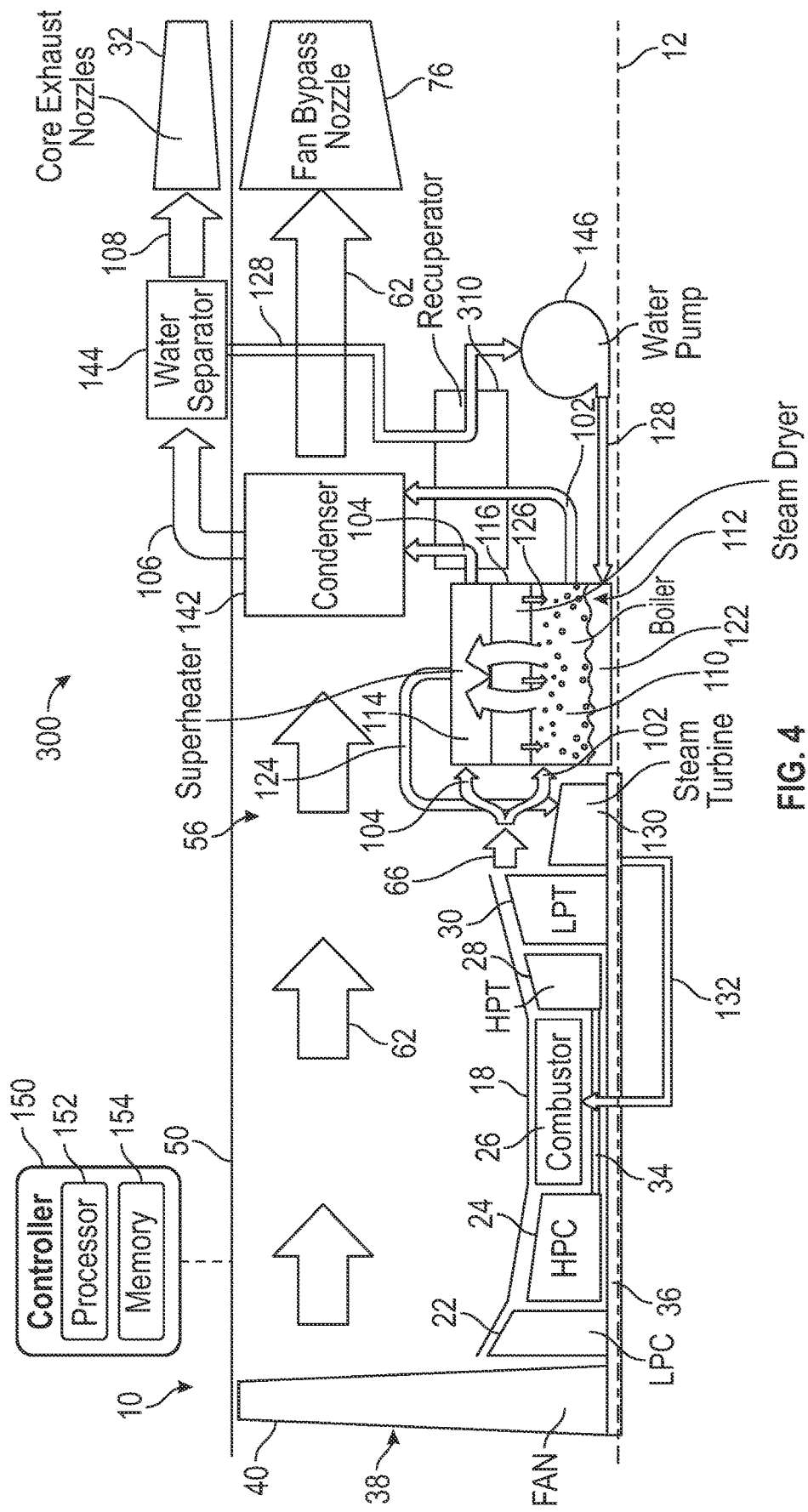
FIG. 4 is a schematic diagram of the turbine engine and a steam system according to an embodiment of the present disclosure.

FIG. 4 is a schematic diagram of the turbine engine 10 having a steam system 300 according to another embodiment of the present disclosure. The steam system 300 of this embodiment may be used as the steam system 100 in the turbine engine 10 shown in FIG. 1. This steam system 300 is similar to the steam systems 100 and 200 discussed above with reference to FIGS. 2 and 3, respectively. The same reference numerals will be used for components of the steam system 300 of this embodiment that are the same as or similar to the components of the steam systems 100 and 200 discussed above. The description of these components above also applies to this embodiment, and a detailed description of these components is omitted here.

As with the steam system 200 discussed above with reference to FIG. 4, the steam system 300 of this embodiment includes a feedwater heater, such as a heat exchanger, fluidly connected to the feedwater 128 to heat the feedwater 128. In this embodiment, the heat absorbed by the feedwater 128 is heat from the combustion gases 66 and, more specifically, one or both of the first combustion gas portion 102 or the second combustion gas portion 104. The heat exchanger of this embodiment is, thus, a recuperator 310. The recuperator 310 is thermally connected to the combustion gases 66 downstream of the boiler 110 and the superheater 114, and upstream of the condenser 142. In this embodiment, the secondary fluid flowing through the recuperator 310 is the combustion gases 66 and, more specifically, one or both of the first combustion gas portion 102 or the second combustion gas portion 104, but an intermediate transfer system may be used where the secondary fluid is an intermediate transfer fluid that absorbs the heat from the combustion gases 66 through a suitable heat exchanger and then flows through the recuperator 310 as the secondary fluid.

As the combustion gases 66 flow through the recuperator 310, the feedwater 128 absorbs heat from the combustion gases 66, heating the feedwater 128 and further cooling the combustion gases 66 before the combustion gases 66 flow into the condenser 142. The recuperator 310 may be positioned relative to the feedwater 128 in the same positions as the feedwater heater 210 discussed above.

Figure 5A:
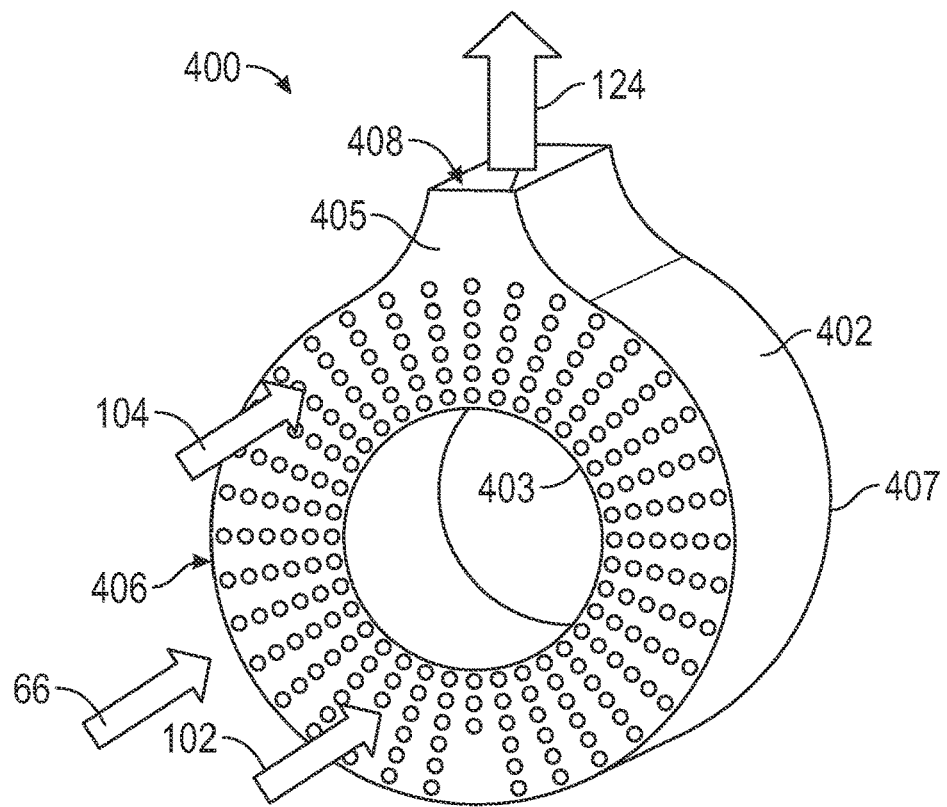
FIG. 5A is a forward schematic view of a boiler assembly, according to the present disclosure.
Figure 5B:
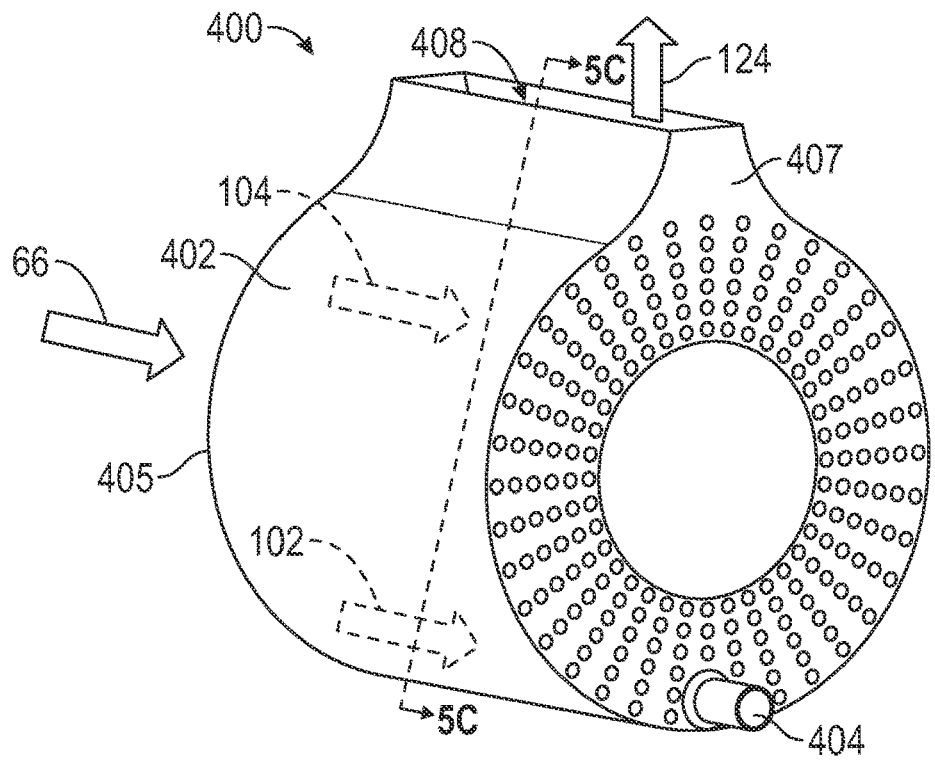
FIG. 5B is an aft schematic view of the boiler assembly of FIG. 5A.
Figure 5C:
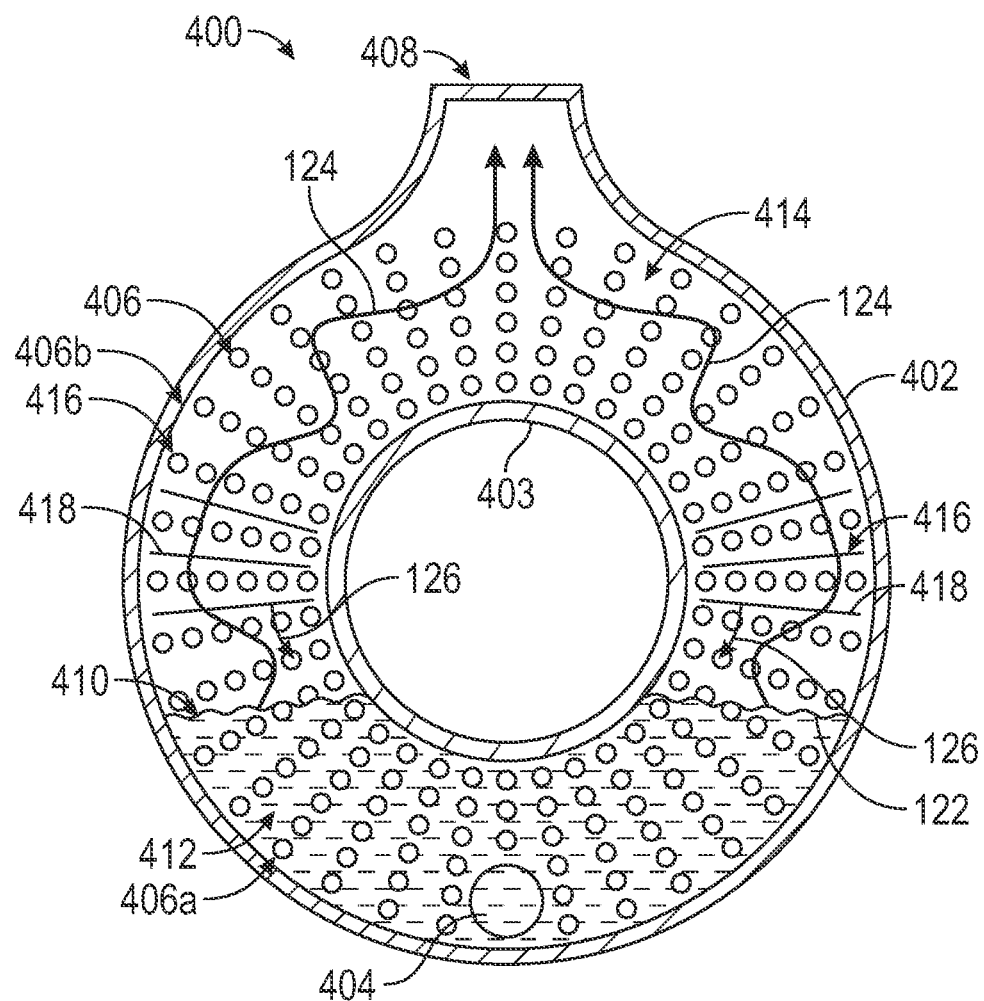
FIG. 5C is a schematic cross-sectional view of the boiler assembly taken along line 5C-5C in FIG. 5B.

FIGS. 5A to 5C show a boiler assembly 400 that may be used in any one of the steam systems shown in FIGS. 2 to 4. FIG. 5A is a forward schematic view of the boiler assembly 400. FIG. 5B is an aft schematic view of the boiler assembly 400. FIG. 5C is a schematic cross-sectional view of the boiler assembly 400 taken along line 5C-5C in FIG. 5B. The boiler assembly 400 includes an outer wall 402, an inner wall 403, a forward end 405, and an aft end 407. The boiler assembly 400 is generally annular. The boiler assembly 400 includes a water inlet 404 (FIG. 5B), one or more combustion gas flowpaths 406 (FIG. 5A), and a steam outlet 408.

As shown in FIG. 5C, the boiler assembly 400 includes one or more internal chambers. The one or more internal chambers are defined between the outer wall 402, the inner wall 403, the forward end 405, and the aft end 407. The one or more internal chambers include a boiler 410 having a reservoir 412, a superheater 414, and a steam dryer 416. The boiler 410, the reservoir 412, the superheater 414, and the steam dryer 416 can be utilized as the boiler 110, the reservoir 112, the superheater 114, and the steam dryer 116, respectively. The corresponding descriptions of the boiler 110, the reservoir 112, the superheater 114, and steam dryer 116 thus apply to the boiler 410, the reservoir 412, the superheater 414, and the steam dryer 416, respectively. The boiler assembly 400 combines the boiler 410, the superheater 414, and steam dryer 416 in a single unitary assembly.

The reservoir 412 stores liquid (e.g., the water 122) therein. The one or more combustion gas flowpaths 406 are flowpaths that are in fluid communication with an outlet of the LPT 30 (FIG. 2) and with the condenser 142 (FIG. 2) for directing the combustion gases 66 from the LPT 30, through the boiler assembly 400, and to the condenser 142, as detailed further below. For example, the one or more combustion gas flowpaths 406 include pipes, tubes, or the like. The one or more combustion gas flowpaths 406 include one or more first combustion gas flowpaths 406a and one or more second combustion gas flowpaths 406b. The one or more first combustion gas flowpaths 406a extend through the boiler 410 (e.g., through the reservoir 412) such that the one or more first combustion gas flowpaths 406a are in thermal communication with the liquid (e.g., the water 122) in the reservoir 412. More specifically as depicted in FIG. 5C, outer surfaces of the first combustion gas flowpaths 406a are wetted surfaces in physical contact with the water 122. The one or more second combustion gas flowpaths 406b extend through the superheater 414 such that the one or more second combustion gas flowpaths 406b are in thermal communication with the steam 124 that flows through the superheater 414. The steam dryer 416 includes one or more steam dryer plates 418 disposed within the steam dryer 416 and between the boiler 410 and the superheater 414.

As depicted in FIG. 5C, the boiler 410 is located in a lower portion of the boiler assembly 400 (e.g., a lower portion of the turbine engine 10 of FIG. 1), such as extending clockwise between an approximately four o'clock position and an approximately eight o'clock position. The superheater 414 is located in an upper portion of the boiler assembly 400 such as extending clockwise between the approximately eight o'clock position and the approximately four o'clock position. In such a configuration, gravitational forces help retain the water 122 in the reservoir 412 with the steam 124 flowing to the superheater 414 in the upper portion of the turbine engine 10. The steam dryer 416 (e.g., the one or more steam dryer plates 418) is positioned between the boiler 410 and the superheater 414 such as, for example, at the three o'clock position and the nine o'clock position. The clock positions of the boiler 410, the superheater 414, and the steam dryer 416 are exemplary only, and the boiler assembly 400 can be configured such that the boiler 410, the superheater 414, and the steam dryer 416 are arranged at any clock positions such that the boiler 410 is upstream of the superheater 414, and the steam dryer 416 is upstream of the superheater 414.

In operation, the boiler 410 receives the water 122 in the reservoir 412 from the water source through the water inlet 404. For example, the water pump 146 (FIG. 2) pumps the feedwater 128 into the boiler 410 through the water inlet 404, and the feedwater 128 is stored as the water 122 in the reservoir 412. A level of the water 122 in the reservoir 412 can be controlled, as detailed above. The boiler 410 receives the combustion gases 66 (FIG. 5A) through the one or more combustion gas flowpaths 406 such that the combustion gases 66 boil the water 122 within the reservoir 412 to generate the steam 124 and superheat the steam 124 within the superheater 414. In particular, the first combustion gas portion 102 flows through the one or more first combustion gas flowpaths 406a and is in thermal contact with the water 122 in the reservoir 412. The first combustion gas portion 102 transfers heat from the first combustion gas portion 102 to the water 122 in the reservoir 412 to heat and to boil the water 122, generating the steam 124.

The boiler 410 can include any type of boiler or heat exchanger for extracting heat from the first combustion gas portion 102 and vaporizing the liquid water 122 into the steam 124 as the first combustion gas portion 102 flows through the boiler 410. In the embodiments discussed herein, the first combustion gas portion 102 flows through the boiler 410 to transfer heat from the first combustion gas portion 102 to the water 122 and to generate the steam 124 by subcooled, nucleate boiling (also referred to as precritical boiling). As depicted in FIG. 5C, the one or more first combustion gas flowpaths 406a may be submerged in the water 122 to facilitate the precritical boiling.

The steam 124 flows from the boiler 410 and through the superheater 414. The second combustion gas portion 104 flows through the one or more second combustion gas flowpaths 406b of the superheater 114. The second combustion gas portion 104 is thus in thermal contact with the steam 124, and heat from the second combustion gas portion 104 flows into the steam 124 adding heat to the steam 124 to superheat the steam 124 within the superheater 414. The superheater 414 may be any suitable heat exchanger for transferring heat between two gases.

As the steam 124 flows from the boiler 410 to the superheater 414, the steam 124 is dried in the steam dryer 416. In particular, the steam 124 impinges on the one or more steam dryer plates 418 and the one or more steam dryer plates 418 separate a portion of the water from the steam 124 (e.g., the separated water 126). In some embodiments, the steam dryer 416 includes one or more screens, one or more filters, or one or more meshes that impede the water in the steam 124 to help separate the water from the steam 124. The separated water 126 flows from the one or more steam dryer plates 418 back into the reservoir 412 of the boiler 410 (e.g., due to gravity). The now dry and superheated steam 124 is directed into the steam turbine 130 (FIG. 2), which generates additional work for the turbine engine 10, as detailed above. In particular, the boiler assembly 400 directs the steam 124 from the superheater 414 to the steam turbine 130 through the steam outlet 408.

FIGS. 6A to 6C show a boiler assembly 500 that may be used in any one of the steam systems shown in FIGS. 2 to 4, according to another embodiment. FIG. 6A is a forward schematic view of the boiler assembly 500. FIG. 6B is a forward schematic view of the boiler assembly 500 with an outer wall 502 removed for clarity. FIG. 6C is a partial schematic cross-sectional view of the boiler assembly 500, taken along line 6C-6C in FIG. 6B.

The boiler assembly 500 includes the outer wall 502, an inner wall 503, a forward end 505, and an aft end 507. The boiler assembly 500 is generally annular. The boiler assembly 500 includes a water inlet 504 (FIGS. 6B and 6C), one or more combustion gas flowpaths 506, and a steam outlet 508. The boiler assembly 500 also includes one or more heat exchanger plates 509. As depicted, the one or more heat exchanger plates 509 include a plurality of heat exchanger plates 509 that are disposed circumferentially about the boiler assembly 500. The one or more heat exchanger plates 509 extend radially between the inner wall 503 to the outer wall 502. The one or more combustion gas flowpaths 506 are defined between adjacent ones of the one or more heat exchanger plates 509. For example, the one or more combustion gas flowpaths 506 are defined between the inner wall 503, the outer wall 502, and the adjacent ones of the one or more heat exchanger plates 509.

As shown in FIG. 6C, the boiler assembly 500 includes one or more internal chambers defined within the one or more heat exchanger plates 509. In this way, the one or more heat exchanger plates 509 are hollow plates. The one or more internal chambers include a boiler 510 having a reservoir 512, a superheater 514, and a steam dryer 516. The boiler 510, the reservoir 512, the superheater 514, and the steam dryer 516 can be utilized as the boiler 110, the reservoir 112, the superheater 114, and the steam dryer 116, respectively. The corresponding descriptions of the boiler 110, the reservoir 112, the superheater 114, and the steam dryer 116 thus apply to the boiler 510, the reservoir 512, the superheater 514, and the steam dryer 516, respectively. The boiler assembly 500 combines the boiler 510, the superheater 514, and steam dryer 516 in a single unitary assembly within the one or more heat exchanger plates 509.

The reservoir 512 stores liquid (e.g., the water 122) therein. The one or more combustion gas flowpaths 506 are flowpaths that are in fluid communication with an outlet of the LPT 30 (FIG. 2) and with the condenser 142 (FIG. 2) for directing the combustion gases 66 from the LPT 30, through the boiler assembly 500, and to the condenser 142. The one or more combustion gas flowpaths 506 are in thermal communication with the one or more heat exchanger plates 509. For example, the one or more combustion gas flowpaths 506 are in thermal communication with the liquid (e.g., the water 122) in the reservoir 512, with the steam 124 that flows through the superheater 514, and with the steam 124 that flows through the steam dryer 516.

As depicted, the boiler 510 of each of the one or more heat exchanger plates 509 is aft of the superheater 514 and the steam dryer 516. In this way, the superheater 514 is upstream of the boiler 510 with respect to a flow of the combustion gases 66, and the steam dryer 516 is disposed between the boiler 510 and the superheater 514. The superheater 514 is downstream of the boiler 510 with respect to a flow of the steam 124 within each of the one or more heat exchanger plates 509.

The water inlet 504 is a water inlet manifold that is fluidly coupled to the water source and to the boiler 510 of each of the one or more heat exchanger plates 509. For example, the water inlet 504 is a tube that is annular about the boiler assembly 500 and is positioned substantially at the aft end 507 of the boiler assembly 500. The water inlet 504 includes one or more water inlet flowpaths 511 in fluid communication with the water inlet 504 and the one or more heat exchanger plates 509. For example, a respective one of the one or more water inlet flowpaths 511 is in fluid communication with a respective one of the one or more heat exchanger plates 509 for supplying the water 122 to the boiler 510 (the reservoir 512) of the respective one of the one or more heat exchanger plates 509.

Each of the one or more heat exchanger plates 509 includes a water return line 513 in fluid communication with the steam dryer 516 and the boiler 510. The water return line 513 is a tube that is fluidly coupled to the steam dryer 516 and to the boiler 510 for returning water from the steam dryer 516 to the boiler 510, as detailed further below.

The steam outlet 508 is a steam outlet manifold that is fluidly coupled to each of the one or more heat exchanger plates 509 and to the steam turbine 130 (FIG. 2). For example, the steam outlet 508 is a tube that is annular about the boiler assembly 500 and is positioned at the forward end 505 of the boiler assembly 500.

In operation, the boiler 510 receives the water 122 in the reservoir 512 from the water source through the water inlet 504. For example, the water pump 146 (FIG. 2) pumps the feedwater 128 into the boiler 510 through a respective one of the one or more water inlet flowpaths 511 of the water inlet 504, and the feedwater 128 is stored as the water 122 in the reservoir 512. A level of the water 122 in the reservoir 512 can be controlled, as detailed above. The combustion gases 66 flow through the one or more combustion gas flowpaths 506 between each of the one or more heat exchanger plates 509 such that the combustion gases 66 transfer heat to the one or more heat exchanger plates 509. The combustion gases 66 in the one or more combustion gas flowpaths 506 boil the water 122 within the reservoir 512 to generate the steam 124 and superheat the steam 124 within the superheater 514. In particular, the combustion gases 66 are in thermal contact with the water 122 in the reservoir 512 in the one or more combustion gas flowpaths 506 and the combustion gases 66 transfer heat from the combustion gases 66 to the water 122 in the reservoir 512 to heat and to boil the water 122, generating the steam 124.

The boiler 510 can include any type of boiler or heat exchanger for extracting heat from the combustion gases 66 and vaporizing the liquid water 122 into the steam 124 as the combustion gases 66 flow through one or more combustion gas flowpaths 506 about the boiler 510 of each of the one or more heat exchanger plates 509. In the embodiments discussed herein, the combustion gases 66 flow through the boiler 510 to transfer heat from the combustion gases 66 to the water 122 and to generate the steam 124 by subcooled, nucleate boiling (also referred to as precritical boiling).

The steam 124 flows from the boiler 510 and through the superheater 514. The combustion gases 66 flowing through the one or more combustion gas flowpaths 506 are in thermal contact with the steam 124 within the superheater 514, and heat from the combustion gases 66 flows into the steam 124 adding heat to the steam 124 to superheat the steam 124 within the superheater 514. The superheater 514 may be any suitable heat exchanger for transferring heat between two gases.

As the steam 124 flows from the boiler 510 to the superheater 514, the steam 124 is dried in the steam dryer 516. In particular, heat is transferred from the combustion gases 66 to the steam 124 in the steam dryer 516 to separate a portion of the water from the steam 124 (e.g., the separated water 126). The steam dryer 516 can be an inertial separator that separates the water from the steam 124. The steam dryer 516 includes a change in flow area as compared to a flow area of the boiler 510 to help separate the water from the steam 124. In some embodiments, the steam dryer 516 includes one or more swirling vanes that direct the water towards the water return line 513. The water return line 513 directs the separated water 126 from the steam dryer 516 back into the reservoir 512 of the boiler 510. The now dry and superheated steam 124 is directed into the steam turbine 130 (FIG. 2), which generates additional work for the turbine engine 10, as detailed above. In particular, the boiler assembly 500 directs the steam 124 from the superheater 514 of each of the one or more heat exchanger plates 509 to the steam turbine 130 through the steam outlet 508. As detailed above, the steam 124 flows the one or more heat exchanger plates 509 from the aft end 507 to the forward end 505. In this way, the steam 124 flows in an opposite direction as the flow of the combustion gases 66 through the boiler assembly 500.

Figure 7A:
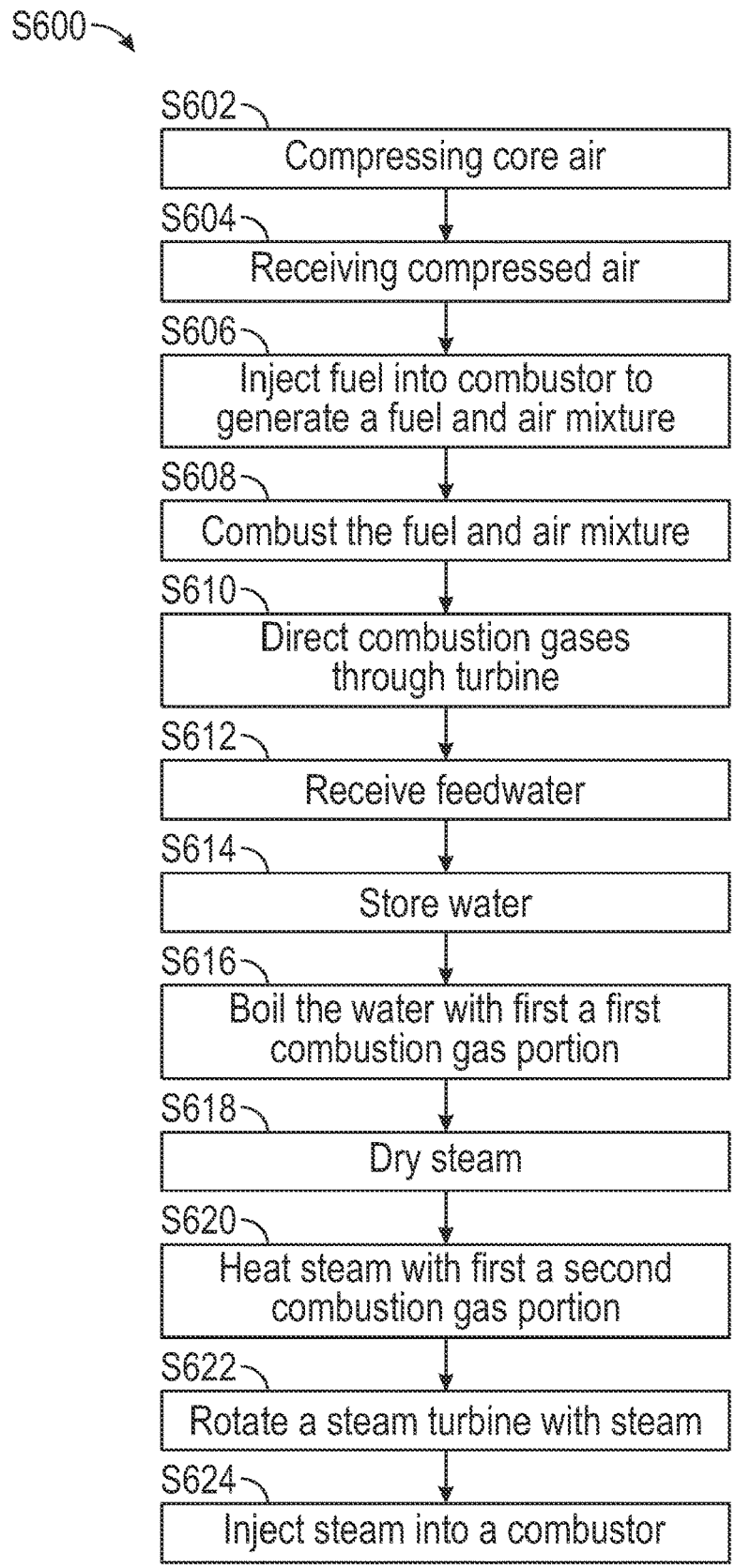

FIGS. 7A to 7C are flow charts for methods of operating the turbine engine 10 shown in FIG. 1 having one of the steam systems 100, 200, 300 discussed above with reference to FIGS. 2 to 4. Additional details of these methods are discussed above with reference to FIGS. 2 to 4 and may be included in the following methods, even if not explicitly identified as a step in the flow charts below. The methods are discussed below in separate flow charts, but these methods, and any portion thereof, can be combined with each other. The controller 150 discussed above can be configured to execute one or more of the steps of the method discussed herein, and similarly, include one or more of the steps of the methods discussed herein as instructions stored on a non-transitory computer readable storage medium, such as the memory 154. These instructions can be executed by the processor 152.

FIG. 7A is a flow chart for a method S600 of operating the turbine engine 10 and producing steam 124 using any one of the steam systems 100, 200, 300 discussed above with reference to FIGS. 2 to 4. The method includes, in step S604 receiving compressed air 65 in the combustor 26. In some embodiments, the method also can include, in preceding step S602, compressing core air 64 with the compressor section 21 in the manner discussed above. In step S606, the method includes injecting fuel 67 into the combustor 26 to mix with the compressed air 65 to generate a fuel and air mixture. In step S608, the method includes combusting the fuel and air mixture in the combustor 26 to generate combustion gases 66 and, in step S610, directing the combustion gases 66 through a turbine (e.g., the HPT 28, the LPT 30) of a turbine section 27 to rotate the turbine and to rotate a shaft coupled to the turbine (e.g., the HP shaft 34, the LP shaft 36, or both), in the manner discussed above.

The method also includes receiving water, such as feedwater 128, in a boiler 110 in step S612. The method can include, in step S614, storing a volume of water 122 in a reservoir 112 of the boiler 110. In step S616, the method includes directing a first combustion gas portion 102 from the combustor 26 to the boiler 110 to boil the water in the boiler 110 to generate steam 124. The method can include, in step S618, drying the steam 124 by removing entrained liquid water (e.g., separated water 126) from the steam 124 in the steam dryer 116. The method includes, in step S620, heating steam 124 by directing a flow of the steam 124 from the boiler 110 to the superheater 114 and directing a second combustion gas portion 104 from the combustor 26 to the superheater 114 to heat the steam 124 in the superheater 114. In step S622, the method includes directing the steam 124 from the superheater 114 to the steam turbine 130 to rotate the steam turbine 130, and causing the shaft (e.g., the HPT 28, the LPT 30) to rotate when the steam turbine 130 rotates. The method, in step S624, can also include directing steam 132 from the superheater 114 to the combustor 26. This steam 132 can be steam directly from the superheater 114 or steam 132 that flows first through the steam turbine 130 in step S622.

FIG. 7B is a flow chart for a method S700 of operating the turbine engine 10 and providing the feedwater 128 using any one of the steam systems 100, 200, 300 discussed above with reference to FIGS. 2 to 4. The method includes, in step S702, receiving combustion gases 66, such as at least one of the first combustion gas portion 102 and the second combustion gas portion 104 after having been directed through the boiler 110 and the superheater 114 in step S616 and step S620, respectively. The method includes, in step S704, condensing feedwater 128 from the combustion gases 66 in a condenser 142 and generating the exhaust-water mixture 106. The method includes, in step S706, separating the feedwater 128 from the exhaust-water mixture 106 in the water separator 144. The method, in step S708, can include heating the feedwater 128, in the manner discussed above with reference to FIGS. 3 and 4. In step S710, the method includes providing a flow of the feedwater 124 into the boiler 110 by the water pump 146.

FIG. 7C is a flow chart of a method S800 for controlling the temperature of the steam 124 output from the superheater 114 by controlling the speed of the water pump 146. The method includes, in step S802, measuring the temperature of the steam 124. In step S804, the method includes comparing the measured temperature of the steam 124 to a set point. If the temperature is higher than the set point, the method proceeds to step S806, and the method includes providing more feedwater 128 to the reservoir 112, such as by increasing the speed of the water pump 146. If the temperature is lower than the set point, the method proceeds to step S808, and the method includes providing less feedwater 128 to the reservoir 112, such as by decreasing the speed of the water pump 146.

The foregoing discussion includes various different components in different embodiments of the steam systems 100, 200, and 300. The components and features of each of these steam systems 100, 200, and 300 are not mutually exclusive and one or more of the components shown and described in one of the steam systems 100, 200, and 300 may be applied to another one of the steam systems 100, 200, and 300.

The steam systems 100, 200, and 300 discussed herein include a boiler 110 having a reservoir 112 therein to heat and to boil water with subcritical nucleate boiling, avoiding thermal transfer problems associated with critical boiling. To then achieve the desired temperature of the steam 124 for the steam turbine 130, the steam 124 is heated by a separate superheater 114. The combustion gases 66 is used for both the boiler 110 and the superheater 114 and, thus, the combustion gases 66 are split into two portions to heat the water 122 and the steam 124, respectively. In some embodiments, the feedwater 128 being supplied to the reservoir 112 of the boiler 110 may be pre-heated by a heat exchanger before flowing into the reservoir 112, such that the first combustion gas portion 102 flowing through the boiler 110 may be efficiently used to generate the steam 124 reducing the heat needed for bringing and maintaining the water 122 at boiling temperatures. Further aspects of the present disclosure are provided by the subject matter of the following clauses.

A turbine engine for an aircraft including a combustor, a shaft, a turbine, and a steam system. The combustor is located in a core air flow path to receive compressed air and fluidly coupled to a fuel source. The fuel is injected into the combustor to mix with the compressed air to generate a fuel and air mixture. The fuel and air mixture is combusted in the combustor to generate combustion gases. The turbine is located downstream of the combustor to receive the combustion gases. The turbine is drivingly coupled to the shaft and rotated in response to receiving the combustion gases. The steam system includes a boiler, a superheater, and a steam turbine. The boiler is located downstream of the combustor. The boiler receives water and is fluidly connected to the combustor to receive a first portion of the combustion gases from the combustor and to boil the water to generate steam. The superheater is fluidly connected to the boiler to receive a flow of the steam from the boiler. The superheater is located downstream of the combustor to receive a second portion of the combustion gases from the combustor and to heat the steam. The steam turbine is fluidly coupled to the superheater to receive the steam from the superheater. The steam turbine is drivingly coupled to the shaft and rotated in response to receiving the steam.

The turbine engine of the preceding clause, wherein the combustor is fluidly coupled to the steam system to receive steam from the steam system and to inject the steam into the combustor.

The turbine engine of the preceding clause, wherein the combustor is fluidly coupled to the steam system downstream of the steam turbine.

The turbine engine of any preceding clause, wherein the boiler includes a reservoir containing a volume of water.

The turbine engine of the preceding clause, wherein the reservoir is sized to contain from 20% to 80% of the liquid water, by volume, in the steam system.

The turbine engine of any preceding clause, wherein the boiler includes a flow passage for the first portion of the combustion gases to flow therethrough, the combustion gases flowing through the water to transfer heat to the water and to generate steam by subcooled, nucleate boiling.

The turbine engine of any preceding clause, wherein the superheater is arranged in parallel with the boiler relative to the flow of the combustion gases through the steam system.

The turbine engine of any preceding clause, wherein the steam system further includes a steam dryer located upstream of the boiler and downstream of the superheater relative to the flow of the steam to remove entrained liquid water from the steam.

The turbine engine of any preceding clause, wherein the steam dryer is a water separator that separates the entrained liquid water from the steam.

The turbine engine of any preceding clause, wherein the water separator is an inertial separator.

The turbine engine of any preceding clause, wherein the water separator is a cyclonic separator.

The turbine engine of any preceding clause, wherein the water separator is fluidly connected to the boiler for the water separated by the water separator to flow into the boiler.

The turbine engine of any preceding clause, wherein the steam system further includes a condenser located downstream of the boiler to condense feedwater from the combustion gases and to generate an exhaust-water mixture, the boiler being fluidly connected to the condenser to receive the feedwater from the condenser.

The turbine engine of any preceding clause, wherein the steam system further includes a water pump in fluid communication with the condenser and with the boiler to induce the flow of feedwater from the condenser into the boiler.

The turbine engine of any preceding clause, wherein the steam system further includes a water separator positioned downstream of the condenser, the water separator separating the feedwater from the exhaust-water mixture, the boiler being fluidly coupled to the water separator.

The turbine engine of any preceding clause, wherein the water separator is a cyclonic separator.

The turbine engine of any preceding clause, wherein the steam system further includes a water pump in fluid communication with the boiler to provide a flow of feedwater into the boiler.

The turbine engine of any preceding clause, wherein the steam system further includes a temperature sensor and a controller. The temperature sensor is positioned in a steam flow path of the steam downstream of the superheater and upstream of the steam turbine, and is configured to generate an output indicative of the temperature of the steam. The controller is communicatively coupled to the temperature sensor to receive the output of the temperature sensor. The controller is communicatively and operatively coupled to the water pump to control the speed of the water pump.

The turbine engine of any preceding clause, wherein the controller compares the temperature of the steam to a set point based on the output of the temperature sensor.

The turbine engine of the preceding clause, wherein the controller is configured to increase the speed of the water pump when the temperature is higher than the set point.

The turbine engine of any preceding clause, wherein the controller is configured to decrease the speed of the water pump when the temperature is lower than the set point.

The turbine engine of any preceding clause, wherein the steam system further includes a feedwater heater fluidly coupled to the boiler upstream of the boiler, the feedwater heater being a heat exchanger to heat the feedwater.

The turbine engine of any preceding clause, wherein the feedwater heater is thermally coupled to the combustion gases to receive heat from the combustion gases and to heat the feedwater.

The turbine engine of any preceding clause, wherein the feedwater heater is thermally coupled to the combustion gases downstream of the condenser.

The turbine engine of any preceding clause, wherein the feedwater heater is thermally coupled to the combustion gases upstream of at least one of the boiler or the superheater.

The turbine engine of any preceding clause, wherein the feedwater heater includes a secondary flow passage for a secondary fluid to flow and to transfer heat from the secondary fluid to the feedwater.

The turbine engine of any preceding clause, wherein the secondary fluid is the combustion gases.

The turbine engine of any preceding clause, wherein the secondary fluid is the first portion of the combustion gas.

The turbine engine of the preceding clause, wherein the feedwater heater is positioned within the hot gas path upstream of the boiler and downstream of the condenser.

The turbine engine of any preceding clause, wherein the secondary fluid is the second portion of the combustion gas.

The turbine engine of the preceding clause, wherein the feedwater heater is positioned within the hot gas path upstream of the superheater and downstream of the condenser.

The turbine engine of any preceding clause, further comprising a compressor located in the core air flow path to compress air flowing through the core air flow path and to provide the compressed air to the compressor, wherein the secondary fluid is cooling air drawn from the compressor.

The turbine engine of any preceding clause, further comprising a flow control valve positioned downstream of the compressor and upstream of the feedwater heater.

The turbine engine of any preceding clause, wherein the shaft is a low-pressure shaft and the turbine is a low-pressure turbine.

The turbine engine of any preceding clause, further comprising a low-pressure compressor connected to the low-pressure shaft to be driven by the low-pressure turbine and the steam turbine.

The turbine engine of any preceding clause, further comprising a fan including a plurality of blades and a fan shaft, the fan shaft being coupled to the low-pressure shaft to be driven by the low-pressure shaft.

The turbine engine of the preceding clause, further comprising a bypass airflow passage, a first portion of air flowing into the fan flows through a bypass airflow passage as bypass air and a second portion of the air flowing into the fan flows through the core air flow path as core air.

The turbine engine of the preceding clause, further comprising a bypass airflow passage and a condenser. The condenser is positioned downstream of the boiler and in the bypass airflow passage for bypass air to cool the combustion gases and to condense the water from the combustion gases.

The turbine engine of any preceding clause, further comprising a low-pressure compressor positioned in the core air flow path upstream of the compressor, the low-pressure compressor being driven by the low-pressure shaft to compress the core air flowing through the core air flow path and to generate the compressed air.

The turbine engine of any preceding clause, further comprising a high-pressure shaft, a high-pressure turbine, and a high-pressure compressor. The high-pressure turbine is positioned downstream of the combustor to receive the combustion gases and to rotate the high-pressure turbine. The high-pressure turbine is positioned upstream of the combustor to receive the combustion gases and to rotate the high-pressure turbine. The high-pressure turbine is drivingly coupled to the high-pressure shaft. The high-pressure compressor is positioned in the core air flow path upstream of the high-pressure compressor and downstream of the low-pressure compressor. The high-pressure compressor is driven by the high-pressure shaft to compress the core air flowing through the core air flow path and to generate the compressed air.

The turbine engine of any preceding clause, wherein the shaft is a high-pressure shaft and the turbine is a high-pressure turbine.

The turbine engine of any preceding clause, further comprising a high-pressure compressor connected to the high-pressure shaft to be driven by the high-pressure turbine and the steam turbine.

The turbine engine of any preceding clause, wherein the boiler and the superheater are contained within a boiler assembly.

The turbine engine of any preceding clause, wherein the steam dryer is contained within the boiler assembly.

The turbine engine of any preceding clause, wherein the boiler assembly is generally annular.

The turbine engine of any preceding clause, wherein the boiler assembly includes one or more combustion gas flowpaths in fluid communication with the low-pressure turbine and the condenser, the one or more combustion gas flowpaths directing the combustion gases through the boiler assembly.

The turbine engine of any preceding clause, wherein the one or more combustion gas flowpaths include one or more first combustion gas flowpaths that extend through the boiler such that the one or more first combustion gas flowpaths are in thermal communication with the water in the reservoir of the boiler.

The turbine engine of any preceding clause, wherein the one or more combustion gas flowpaths include one or more second combustion gas flowpaths that extend through the superheater such that the one or more second combustion gas flowpaths are in thermal communication with the steam in the superheater.

The turbine engine of any preceding clause, wherein the steam dryer includes one or more steam dryer plates that are disposed within the steam dryer between the boiler and the superheater, the one or more steam dryer plates separating water from the steam to generate separated water.

The turbine engine of any preceding clause, the one or more steam dryer plates directing the separated water into the reservoir of the boiler.

The turbine engine of any preceding clause, the boiler extending between an approximately four o'clock position and an approximately eight o'clock position of the boiler assembly.

The turbine engine of any preceding clause, the superheater extending between the approximately eight o'clock position and the approximately four o'clock position.

The turbine engine of any preceding clause, wherein the steam dryer is positioned at an approximately three o'clock position and an approximately nine o'clock position of the boiler assembly.

The turbine engine of any preceding clause, wherein the boiler assembly includes a water inlet in fluid communication with the water source and the reservoir, the water inlet direct the feedwater into the reservoir from the water source.

The turbine engine of any preceding clause, wherein the boiler assembly includes a steam outlet in fluid communication with the superheater and the steam turbine, the steam outlet directing the steam from the superheater to the steam turbine.

The turbine engine of any preceding clause, wherein the boiler assembly includes one or more heat exchanger plates.

The turbine engine of any preceding clause, wherein each of the one or more heat exchanger plates comprises the boiler and the superheater.

The turbine engine of any preceding clause, wherein each of the one or more heat exchanger plates comprises the steam dryer.

The turbine engine of any preceding clause, wherein each of the one or more heat exchanger plates comprises a water return line in fluid communication with the steam dryer and the boiler, the water return line directing the separated water from the steam dryer to the boiler.

The turbine engine of any preceding clause, wherein the water inlet is a water inlet manifold that is generally annular.

The turbine engine of any preceding clause, wherein the steam outlet is a steam outlet manifold that is generally annular.

The turbine engine of any preceding clause, wherein the water inlet includes one or more water inlet flowpaths, and a respective one of the one or more water inlet flowpaths is in fluid communication with a respective one of the one or more heat exchanger plates, the one or more water inlet flowpaths directing the water from the water inlet into the one or more heat exchanger plates.

The turbine engine of any preceding clause, wherein the steam flows within the boiler assembly in an opposite direction of the combustion gases.

The turbine engine of any preceding clause, wherein the one or more heat exchanger plates include a plurality of heat exchanger plates.

The turbine engine of any preceding clause, wherein the one or more combustion gas flowpaths are defined between adjacent ones of the one or more heat exchanger plates.

A method of operating a turbine engine for an aircraft comprising receiving compressed air in a combustor, injecting fuel into the combustor to mix with the compressed air to generate a fuel and air mixture, combusting the fuel and air mixture in the combustor to generate combustion gases, directing the combustion gases through a turbine to rotate the turbine and to rotate a shaft coupled to the turbine, receiving water in a boiler, directing a first portion of the combustion gases from the combustor to the boiler to boil the water in the boiler to generate steam, directing a flow of the steam from the boiler to a superheater, directing a second portion of the combustion gases from the combustor to the superheater to heat the steam in the superheater, directing the steam from the superheater to a steam turbine to rotate the steam turbine, and causing the shaft to rotate when the steam turbine rotates.

The method of the preceding clause, further comprising directing steam from the superheater to the combustor.

The method of any preceding clause, further comprising storing a volume of water a reservoir of the boiler.

The method of the preceding clause, wherein the reservoir is sized to contain from 20% to 80% of the liquid water, by volume, in the steam system.

The method of any preceding clause, further comprising directing the first portion of the combustion gases through a flow passage of the boiler that extends through the water, and transferring heat from the first portion of the combustion gases to the water to generate steam by subcooled, nucleate boiling.

The method of any preceding clause, wherein the superheater is arranged in parallel with the boiler relative to the flow of the combustion gases through the steam system.

The method of any preceding clause, further comprising removing entrained liquid water from the steam in a steam dryer located upstream of the boiler and downstream of the superheater relative to the flow of the steam.

The method of any preceding clause, wherein the steam dryer is a water separator, and the method further comprises separating the entrained liquid water from the steam in the water separator.

The method of any preceding clause, wherein the water separator is an inertial separator.

The method of any preceding clause, wherein the water separator is a cyclonic separator.

The method of any preceding clause, further comprising directing the water separated by the water separator into the boiler.

The method of any preceding clause, further comprising condensing feedwater from the combustion gases in a condenser located downstream of the boiler, generating an exhaust-water mixture, and directing the feedwater from the condenser to the boiler.

The method of any preceding clause, further comprising inducing a flow of the feedwater from the condenser into the boiler by a water pump.

The method of any preceding clause, further comprising separating the feedwater from the exhaust-water mixture in a water separator positioned downstream of the condenser.

The method of any preceding clause, wherein the water separator is a cyclonic separator.

The method of any preceding clause, further comprising providing a flow of the feedwater into the boiler by a water pump.

The method of any preceding clause, wherein the steam system further includes a temperature sensor and a controller. The temperature sensor is positioned in a steam flow path of the steam downstream of the superheater and upstream of the steam turbine, further comprising generating, by a temperature, an output indicative of a temperature of the steam, receiving, by a controller, the output of the temperature sensor, and controlling, by the controller, a speed of the water pump.

The method of any preceding clause, further comprising comparing, by the controller, the temperature of the steam to a set point based on the output of the temperature sensor.

The method of the preceding clause, further comprising increasing, by the controller, the speed of the water pump when the temperature is higher than the set point.

The method of any preceding clause, further comprising decreasing, by the controller, the speed of the water pump when the temperature is lower than the set point.

The method of any preceding clause, further comprising heating the feedwater with a feedwater heat that is fluidly coupled to the boiler upstream of the boiler.

The method of any preceding clause, further comprising transferring heat from the combustion gases to heat the feedwater in the feedwater heater.

The method of any preceding clause, wherein the feedwater heater is thermally coupled to the combustion gases downstream of the condenser.

The method of any preceding clause, wherein the feedwater heater is thermally coupled to the combustion gases upstream of at least one of the boiler or the superheater.

The method of any preceding clause, wherein the feedwater heater includes a secondary flow passage for a secondary fluid, and the method further comprises directing the secondary fluid to flow through the secondary flow passage, and transferring heat from the secondary fluid to the feedwater.

The method of any preceding clause, wherein the secondary fluid is the combustion gases.

The method of any preceding clause, wherein the secondary fluid is the first portion of the combustion gas.

The method of the preceding clause, wherein the feedwater heater is positioned within the hot gas path upstream of the boiler and downstream of the condenser.

The method of any preceding clause, wherein the secondary fluid is the second portion of the combustion gas.

The method of the preceding clause, wherein the feedwater heater is positioned within the hot gas path upstream of the superheater and downstream of the condenser.

The method of any preceding clause, further comprising compressing air flowing through a core air flow path of the turbine engine in a compressor, wherein the secondary fluid is cooling air drawn from the compressor.

The method of any preceding clause, further comprising a flow control valve positioned downstream of the compressor and upstream of the feedwater heater.

The method of any preceding clause, wherein the shaft is a low-pressure shaft and the turbine is a low-pressure turbine.

The method of any preceding clause, wherein a low-pressure compressor is connected to the low-pressure shaft, and the method further comprises driving the low-pressure shaft by the low-pressure turbine and the steam turbine.

The method of any preceding clause, further comprising a fan including a plurality of blades and a fan shaft, the fan shaft being coupled to the low-pressure shaft to be driven by the low-pressure shaft.

The method of the preceding clause, wherein the turbine engine includes a bypass airflow passage, and the method further comprises flowing a first portion of air from the fan and through the bypass airflow passage as bypass air, and flowing a second portion of the air from the fan and through the core air flow path as core air.

The method of the preceding clause, wherein the condenser is positioned in the bypass airflow passage, and the method further comprises directing the bypass air to cool the combustion gases in the condenser, and condensing the water from the combustion gases.

The method of any preceding clause, wherein the turbine engine includes a high-pressure shaft, a high-pressure turbine, and a high-pressure compressor. The method further comprises receiving the combustion gases in the high-pressure turbine to rotate the high-pressure shaft, and driving the high-pressure compressor by the high-pressure shaft to compress the core air flowing through the core air flow path and to generate the compressed air.

The method of any preceding clause, wherein the shaft is a high-pressure shaft and the turbine is a high-pressure turbine.

The method of any preceding clause, further comprising a high-pressure compressor connected to the high-pressure shaft to be driven by the high-pressure turbine and the steam turbine.

The method of any preceding clause, wherein the boiler and the superheater are contained within a boiler assembly.

The method of any preceding clause, wherein the steam dryer is contained within the boiler assembly.

The method of any preceding clause, wherein the boiler assembly is generally annular.

The method of any preceding clause, wherein the boiler assembly includes one or more combustion gas flowpaths in fluid communication with the low-pressure turbine and the condenser, and the method further comprises directing the combustion gases through the boiler assembly in the one or more combustion gas flowpaths.

The method of any preceding clause, wherein the one or more combustion gas flowpaths include one or more first combustion gas flowpaths that extend through the boiler such that the one or more first combustion gas flowpaths are in thermal communication with the water in the reservoir of the boiler.

The method of any preceding clause, wherein the one or more combustion gas flowpaths include one or more second combustion gas flowpaths that extend through the superheater such that the one or more second combustion gas flowpaths are in thermal communication with the steam in the superheater.

The method of any preceding clause, wherein the steam dryer includes one or more steam dryer plates that are disposed within the steam dryer between the boiler and the superheater, and the method further comprises separating water from the steam to generate separated water with the one or more steam dryer plates.

The method of any preceding clause, further comprising directing the separated water into the reservoir of the boiler with the one or more steam dryer plates.

The method of any preceding clause, the boiler extending between an approximately four o'clock position and an approximately eight o'clock position of the boiler assembly.

The method of any preceding clause, the superheater extending between the approximately eight o'clock position and the approximately four o'clock position.

The method of any preceding clause, wherein the steam dryer is positioned at an approximately three o'clock position and an approximately nine o'clock position of the boiler assembly.

The method of any preceding clause, wherein the boiler assembly includes a water inlet in fluid communication with the water source and the reservoir, and the method further comprises directing the feedwater into the reservoir from the water source through the water inlet.

The method of any preceding clause, wherein the boiler assembly includes a steam outlet in fluid communication with the superheater and the steam turbine, and the method further comprises directing the steam from the superheater to the steam turbine through the steam outlet.

The method of any preceding clause, wherein the boiler assembly includes one or more heat exchanger plates.

The method of any preceding clause, wherein each of the one or more heat exchanger plates comprises the boiler and the superheater.

The method of any preceding clause, wherein each of the one or more heat exchanger plates comprises the steam dryer.

The method of any preceding clause, wherein each of the one or more heat exchanger plates comprises a water return line in fluid communication with the steam dryer and the boiler, and the method further comprises directing the separated water from the steam dryer to the boiler through the water return line.

The method of any preceding clause, wherein the water inlet is a water inlet manifold that is generally annular.

The method of any preceding clause, wherein the steam outlet is a steam outlet manifold that is generally annular.

The method of any preceding clause, wherein the water inlet includes one or more water inlet flowpaths, and a respective one of the one or more water inlet flowpaths is in fluid communication with a respective one of the one or more heat exchanger plates, and the method further comprises directing the water from the water inlet into the one or more heat exchanger plates through the one or more water inlet flowpaths.

The method of any preceding clause, further comprising flowing the steam within the boiler assembly in an opposite direction of the combustion gases.

The method of any preceding clause, wherein the one or more heat exchanger plates include a plurality of heat exchanger plates.

The method of any preceding clause, wherein the one or more combustion gas flowpaths are defined between adjacent ones of the one or more heat exchanger plates.

Although the foregoing description is directed to certain embodiments, other variations and modifications will be apparent to those skilled in the art, and may be made without departing from the disclosure. Moreover, features described in connection with one embodiment may be used in conjunction with other embodiments, even if not explicitly stated above.

The invention claimed is:

1. A turbine engine for an aircraft, the turbine engine comprising:
  a combustor located in a core air flow path to receive compressed air and fluidly coupled to a fuel source, the fuel being injected into the combustor to mix with the compressed air to generate a fuel and air mixture, the fuel and air mixture being combusted in the combustor to generate combustion gases;
  a shaft;
  a turbine located downstream of the combustor to receive the combustion gases, the turbine being drivingly coupled to the shaft and rotated in response to receiving the combustion gases; and
  a steam system including:
    a boiler located downstream of the combustor, the boiler having water therein and being fluidly connected to the combustor to receive a first portion of the combustion gases from the combustor and to boil the water to generate steam;
    a superheater fluidly connected to the boiler to receive a flow of the steam from the boiler, the superheater being located downstream of the combustor to receive a second portion of the combustion gases from the combustor and to heat the steam;
    a steam dryer located downstream of the boiler and upstream of the superheater relative to the flow of the steam to remove entrained liquid water from the steam; and
    a steam turbine fluidly coupled to the superheater to receive the steam from the superheater, the steam turbine being drivingly coupled to the shaft and rotated in response to receiving the steam.

2. The turbine engine of claim 1, wherein the boiler includes a flow passage for the first portion of the combustion gases to flow therethrough, the combustion gases flowing through the flow passage to transfer heat to the water and to generate steam by subcooled, nucleate boiling.

3. The turbine engine of claim 1, wherein the superheater is arranged in parallel with the boiler relative to the flow of the combustion gases through the steam system.

4. The turbine engine of claim 1, wherein the combustor is fluidly coupled to the steam system to receive the steam from the steam system and to inject the steam into the combustor.

5. The turbine engine of claim 4, wherein the combustor is fluidly coupled to the steam system downstream of the steam turbine relative to the flow of steam.

6. The turbine engine of claim 1, wherein the steam dryer is an inertial water separator that separates the entrained liquid water from the steam.

7. The turbine engine of claim 6, wherein the inertial water separator is fluidly connected to the boiler for the water separated by the inertial water separator to flow into the boiler.

8. The turbine engine of claim 1, wherein the steam system further includes a condenser located downstream of the boiler to condense feedwater from the combustion gases and to generate an exhaust-water mixture, the boiler being fluidly connected to the condenser to receive the feedwater from the condenser.

9. The turbine engine of claim 8, wherein the steam system further includes a water separator positioned downstream of the condenser, the water separator separating the feedwater from the exhaust-water mixture, the boiler being fluidly coupled to the water separator.

10. A turbine engine for an aircraft, the turbine engine comprising:
  a combustor located in a core air flow path to receive compressed air and fluidly coupled to a fuel source, the fuel being injected into the combustor to mix with the compressed air to generate a fuel and air mixture, the fuel and air mixture being combusted in the combustor to generate combustion gases;
  a shaft;
  a turbine located downstream of the combustor to receive the combustion gases, the turbine being drivingly coupled to the shaft and rotated in response to receiving the combustion gases; and
  a steam system including:
    a boiler located downstream of the combustor, the boiler having water therein and receiving feedwater to supplement the water, the boiler being fluidly connected to the combustor to receive a first portion of the combustion gases from the combustor and to boil the water to generate steam;
    a superheater fluidly connected to the boiler to receive a flow of the steam from the boiler, the superheater being located downstream of the combustor to receive a second portion of the combustion gases from the combustor and to heat the steam;
    a steam turbine fluidly coupled to the superheater to receive the steam from the superheater, the steam turbine being drivingly coupled to the shaft and rotated in response to receiving the steam;
    a condenser located downstream of the boiler to receive the first portion of the combustion gases, the second portion of the combustion gases, or both to condense the feedwater therefrom and to generate an exhaust-water mixture;
    a water separator positioned downstream of the condenser, the water separator separating the feedwater from the exhaust-water mixture, the boiler being fluidly coupled to the water separator;
    a water pump in fluid communication with the boiler to provide a flow of the feedwater into the boiler;
    a temperature sensor positioned in a steam flow path of the steam downstream of the superheater and upstream of the steam turbine and configured to generate an output indicative of the temperature of the steam; and
    a controller communicatively coupled to the temperature sensor to receive the output of the temperature sensor, the controller being communicatively and operatively coupled to the water pump to control the speed of the water pump based on the output of the temperature sensor.

11. The turbine engine of claim 10, wherein the controller compares the temperature of the steam to a set point based on the output of the temperature sensor, and
wherein the controller is configured (i) to increase the speed of the water pump when the temperature is higher than the set point and (ii) to decrease the speed of the water pump when the temperature is lower than the set point.

12. A turbine engine for an aircraft, the turbine engine comprising:
a combustor located in a core air flow path to receive compressed air and fluidly coupled to a fuel source, the fuel being injected into the combustor to mix with the compressed air to generate a fuel and air mixture, the fuel and air mixture being combusted in the combustor to generate combustion gases;
a shaft;
a turbine located downstream of the combustor to receive the combustion gases, the turbine being drivingly coupled to the shaft and rotated in response to receiving the combustion gases; and
a steam system including:
a boiler located downstream of the combustor, the boiler having water therein and receiving feedwater to supplement the water, the boiler being fluidly connected to the combustor to receive a first portion of the combustion gases from the combustor and to boil the water to generate steam;
a superheater fluidly connected to the boiler to receive a flow of the steam from the boiler, the superheater being located downstream of the combustor to receive a second portion of the combustion gases from the combustor and to heat the steam;
a condenser located downstream of the boiler to receive the first portion of the combustion gases, the second portion of the combustion gases, or both and condense the feedwater therefrom, the boiler being fluidly connected to the condenser to receive the feedwater from the condenser;
a feedwater heater fluidly coupled to the boiler upstream of the boiler, the feedwater heater being a heat exchanger to heat the feedwater; and
a steam turbine fluidly coupled to the superheater to receive the steam from the superheater, the steam turbine being drivingly coupled to the shaft and rotated in response to receiving the steam.

13. The turbine engine of claim 12, wherein the feedwater heater is thermally coupled to the combustion gases to receive heat from the combustion gases and to heat the feedwater.

14. The turbine engine of claim 13, wherein the feedwater heater is thermally coupled to the combustion gases downstream of the condenser, and thermally coupled to the combustion gases upstream of at least one of the boiler or the superheater.

15. The turbine engine of claim 12, wherein the feedwater heater includes a secondary flow passage for a secondary fluid to flow and to transfer heat from the secondary fluid to the feedwater.

16. The turbine engine of claim 15, wherein the secondary fluid is the combustion gases.

17. The turbine engine of claim 15, wherein the secondary fluid is at least one of the first portion of the combustion gases or the second portion of the combustion gases.

18. The turbine engine of claim 15, further comprising a compressor located in the core air flow path to compress air flowing through the core air flow path and to provide the compressed air to the compressor, wherein the secondary fluid is cooling air drawn from the compressor.

19. The turbine engine of claim 12, wherein the superheater is arranged in parallel with the boiler relative to the flow of the combustion gases through the steam system.

20. The turbine engine of claim 12, wherein the combustor is fluidly coupled to the steam system to receive the steam from the steam system and to inject the steam into the combustor.

* * * * *